United States Patent [19]
Ishida

[11] Patent Number: 5,845,314
[45] Date of Patent: Dec. 1, 1998

[54] DATA STORAGE APPARATUS, DATA READING APPARATUS AND DATA TRANSMISSION APPARATUS

[75] Inventor: Fumitoshi Ishida, Kanagawa, Japan

[73] Assignee: Sony Corporation, Tokyo, Japan

[21] Appl. No.: 678,335

[22] Filed: Jul. 11, 1996

[30] Foreign Application Priority Data

Jul. 14, 1995 [JP] Japan .................................. 7-178898

[51] Int. Cl.$^6$ ................................................ G06F 12/00
[52] U.S. Cl. ...................... 711/104; 711/113; 711/114; 711/167; 711/220
[58] Field of Search .................................. 711/104, 167, 711/220, 113, 114, 239; 364/239

[56] References Cited

U.S. PATENT DOCUMENTS

| | | | |
|---|---|---|---|
| 4,149,239 | 4/1979 | Jenkins et al. ........................ | 711/108 |
| 5,396,596 | 3/1995 | Hashemi et al. ...................... | 364/239 |
| 5,579,500 | 11/1996 | Sekibe et al. ........................ | 711/220 |
| 5,603,002 | 2/1997 | Hashimoto ............................ | 711/113 |
| 5,611,069 | 3/1997 | Matoba ................................. | 711/114 |

*Primary Examiner*—Tod R. Swann
*Assistant Examiner*—Mehdi Namazi
*Attorney, Agent, or Firm*—Frommer Lawrence & Haug, LLP; William S. Frommer; Dennis M. Smid

[57] ABSTRACT

A data transmission apparatus including a plurality of buffers for sequentially receiving individual data to be stored in a plurality of memories at every predetermine period and storing supplied data for a predetermined period, a plurality of latch circuits for receiving storage address data of data shifted at every predetermined period and holding supplied storage address data for a predetermined holding period from a time point at which storage address data are supplied, a write timing generator for write-activating a plurality of memories at its memory in which data held in each buffer is to be stored, and a read timing generator for read-activating a memory corresponding to a latch circuit to which storage address data is supplied after a predetermined delay time since storage address data was supplied.

15 Claims, 10 Drawing Sheets

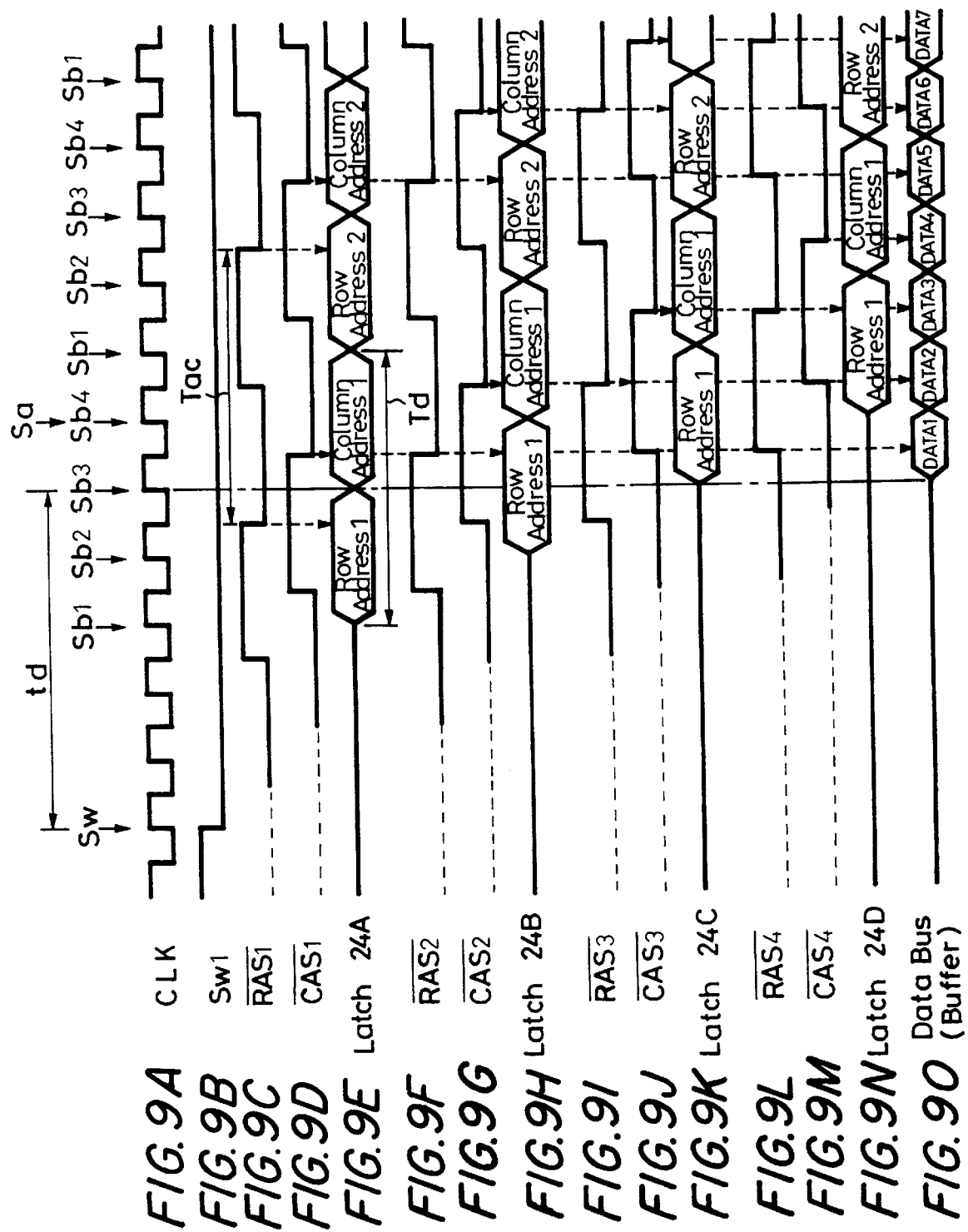

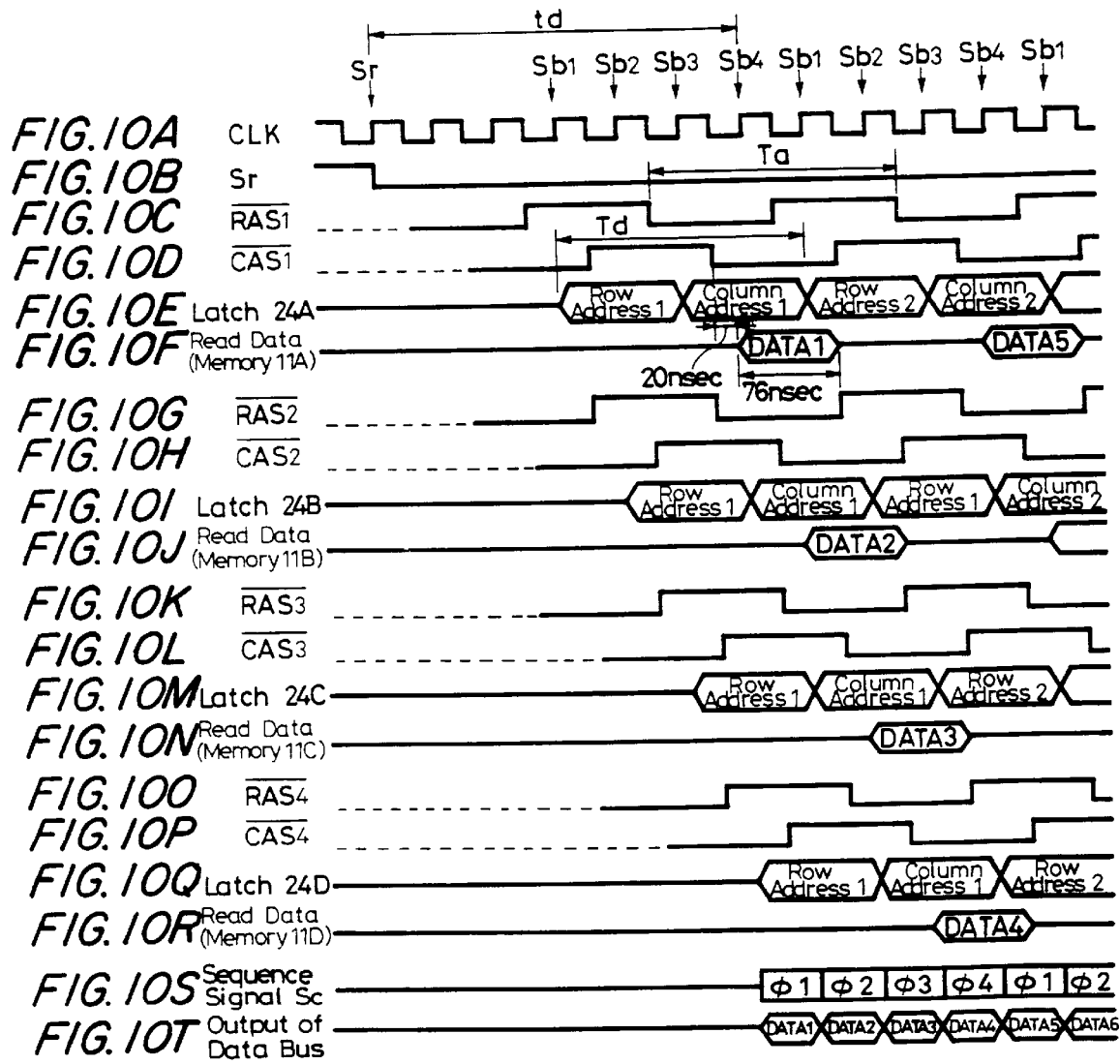

DATA STORAGE APPARATUS, DATA READING APPARATUS AND DATA TRANSMISSION APPARATUS

BACKGROUND OF THE INVENTION

The present invention relates to data storage apparatus for separating data row transmitted through a data bus into unit data and storing the same in a plurality of memories, data reading device for reading data from a plurality of memories in series and supplying the same to the data bus as one data row and a data transmission apparatus used to access data between a computer and an external storage device, for example.

As a memory for storing data mass-storage data row comprising a number of consecutive data, there is generally used a DRAM (dynamic random-access memory) with a simple memory cell structure capable of increasing an integration degree.

As an access system for the DRAM, there is employed an address multiplex system in which two kinds of address input signals (row address signal and column address signal) for designating positions of memory cells arranged in a matrix fashion are inputted from the same input pin in a time-division manner.

According to this address multiplex system, two kinds of external clock signals called /RAS (row address strobe) and/CAS (column address strobe) are used. If /RAS signal is inputted after the row address input signal was inputted, then the row address input signal is supplied to the inside and latched as row address. If/CAS signal is inputted after the column address input signal was input to the same address pin, then the column address input signal is supplied to the inside and latched as column address. DAta is written in or read out from the memory cell corresponding to the latched row address and column address.

This system can reduce the number of pins of the memory so that the package can be miniaturized and that a mounting density can be increased.

In the DRAM, the access speed of the DRAM is low so that data transferred at high speed on the data bus cannot directly be written or that data read out from the external storage device cannot directly be transmitted to the data bus controlled by a high-speed transfer rate.

When the DRAM is used as a disk cache connected between a computer and a hard disk device through a data bus, for example, a high-speed access between the computer and the hard disk device cannot be realized.

Therefore, as shown in FIG. 1 of the accompanying drawings, a SRAM (static random-access memory) 102 of small capacity capable of a high-speed access is connected between a data bus D and a low-speed DRAM of large storage capacity 101 as a cache memory and data is temporarily saved in the SRAM 102, whereby a high-speed data exchange becomes possible apparently.

However, the SRAM 102 capable of high-speed access is expensive and limited in storage capacity so that mass-storage data row cannot be transmitted continuously.

FIG. 2 shows an example in which the above DRAM 101 is divided into four memories 101A to 101D, a data transmission apparatus comprises these four memories 101A to 101D connected in parallel and this data transmission apparatus is connected between the data bus and the hard disk device as a disk cache. This device separates data row (comprising a number of consecutive data) transmitted through the data bus at the data unit, supplies separated data row to the four memories 101A to 101D, further reads out data from the four memories 101A to 101D and supplies the same to the data bus as one data row.

Specifically, the arrangement of disk cache will be described below. This disk cache comprises four data reading latch circuits (referred to as "first to fourth latch circuits 111A through 111D for the sake of convenience) provided in response to the four memories 101A to 101D, four data writing latch circuits (fifth to eighth latch circuits 112A to 112D for the sake of convenience) provided in response to the latch circuits 111A to 111D, four data reading latch circuits (ninth to twelfth latch circuits 113A to 113D for the sake of convenience) provided in response to the four memories 101A to 101D, and a multiplexer 114 having four input terminals $\phi1$ to $\phi4$ and one output terminal.

Input terminals of the first to fourth latch circuits 111A to 111D are connected to the data bus, and output terminals thereof are respectively connected to input terminals of the fifth to eighth latch circuits 112A to 112D. The fifth to eighth latch circuits 112A to 112D are connected to the corresponding first and fourth memories 101A to 101D by internal bus lines, and the memories 101A to 101D are connected to the corresponding ninth to twelfth latch circuits 113A to 113D of the succeeding stage by the same internal bus line.

The ninth to twelfth latch circuits 113A to 113D are connected to the corresponding input terminals $\phi1$ to $\phi4$ of the multiplexer 14, respectively, and the output terminal of the multiplexer 113 is connected to the data bus.

Although not shown, this disk cache includes a timing generating circuit for generating and outputting timing signals to be supplied to the latch circuits and external clock signals supplied to the memories based on a reference clock signal from a clock signal generating circuit for generating the reference clock signal.

An operation of this disk cache will be described with reference to a timing chart of FIG. 3. After a predetermined time period of an input timing at which data row is entered through the data bus, in the example of FIG. 3, after a predetermined time period of an input timing at which first DATA is entered, an enable signal from a timing generator is inputted to the first latch circuit 111A, whereby the first data DATA1 of data row is inputted to the first latch circuit 111A. The first data DATA1 is stored in the first latch circuit 111A during a predetermined storing period (in this example, a period corresponding to a memory access period).

Thereafter, after a predetermined period of time from an input timing at which second data DATA2 in data row is entered, an enable signal from a timing generator is inputted to the second latch circuit 111B, whereby the second data DATA2 is stored in the second latch circuit 111B during a predetermined period.

Thereafter, after a predetermined period of time from an input timing at which third data DATA3 in the data row, an enable signal from the timing generator is inputted to the third latch circuit 111C, whereby the third data DATA3 is stored in the third latch circuit 111C during a predetermined period of time.

Then, after a predetermined period of time from an input timing at which fourth data DATA4 in the data row is inputted, an enable signal from the timing generator is inputted to the latch circuit 111D, whereby the fourth data DATA4 is stored in the fourth latch circuit 111D during a predetermined period of time.

Then, after a predetermined period of time from an input timing at which fifth data DATA5 in the data row is inputted, an enable signal from the timing generator is supplied to the fifth to eighth latch circuits 112A to 112D, whereby the first to fourth data DATA1 to DATA4 stored in the first to fourth latch circuits 111A to 111D are respectively inputted to the fifth to eighth latch circuits 112A to 112D, thereby stored during predetermined period of times (in this example, periods corresponding to the memory access period).

Therefore, the first to fourth data DATA1 to DATA4 are respectively stored under the condition that their phases are matched and extended by the period corresponding to the memory access period. At that time, the enable signal from the timing generator is supplied to the first latch circuit 111A so that the fifth data DATA5 is stored in the first latch circuit 111A. Also, at this timing point, the address signal is applied to the first to fourth memories 101A to 101D.

The data stored in the fifth to eighth latch circuits 112A to 112D are latched in the first to fourth memories 101A to 101D when a write enable signal outputted from the timing generator is supplied to the first to fourth memories 101A to 101D, and stored in the memory areas at their addresses shown by the address signals applied. In other words, the first to fourth data DATA1 to DATA4 in the data row are written in the corresponding first to fourth memories 101A to 101D at a common timing.

The succeeding fifth to eighth data DATA5 to DATA8 in the data row are written in the corresponding first to fourth memories 101A to 101D at the common timing by similar operations. A read operation of data in the disk cache will not be described herein.

However, the disk cache shown in FIG. 2 needs the data storing circuits (fifth to eighth latch circuits 112A to 112D) for storing a large number of data during a long period of time, and hence the circuit scale is increased considerably.

OBJECTS AND SUMMARY OF THE INVENTION

It is an object of the present invention to provide a data storage device in which high-speed and large capacity data row can be written in a plurality of memories.

It is another object of the present invention to provide a data reading device in which data are read out from a plurality of memories and can be transmitted to the succeeding circuit system as high-speed, consecutive and large capacity data row.

It is a further object of the present invention to provide a data transmission apparatus in which consecutive and large capacity data row between a computer and an external storage device can be accessed at high speed.

According to the present invention, there is provided a data writing circuit which is comprised of a plurality of data holding means provided in response to a plurality of data storing means, sequentially receiving individual data to be stored in the data storing means at every predetermined period, and holding supplied data during the predetermined period, a plurality of address holding means provided in response to the plurality of data storing means, receiving address information indicative of storage address of each data shifted at every predetermined period and holding supplied address information during a predetermined address holding period from a time point at which address information is supplied, a data holding period of the data holding means being included in the address holding period of an address holding means corresponding to the data holding means, and write control means for write-activating the plurality of data storing means at its data storing means in which data held in each data holding means is to be stored, wherein the data holding period of the data holding means is included in the address holding period of the address holding means corresponding to the data holding means, and the write-activated data storing means stores data held in a corresponding data holding means at its storage position shown by address information held in a corresponding address holding means.

Consequently, storage address data of data stored in each data storing means are shifted and supplied to a plurality of address holding means at every predetermined period and each address holding means holds supplied address information during a predetermined address holding period from a timing point at which address information is supplied.

On the other hand, individual data to be stored in each data storing means are sequentially supplied to a plurality of data holding means at every predetermined period, and data supplied to each data holding means is held by each data holding means during a predetermined period.

Then, of a plurality of data storing means, a data storing means in which data held in a plurality of data holding means are to be stored is write-activated by the write control circuit. In this case, since a data holding period in one data holding means is included in the address holding period at the address holding means corresponding to the data holding means, at the time the data storing means is write-activated, storage address data to the data storing means is held in the address holding means corresponding to the data storing means. Accordingly, the data storing means is write-activated by the write control circuit so that data held in the corresponding data holding means is stored in the storage area at its storage address shown by the address information stored in the corresponding address holding means.

Specifically, having examined each of the address holding means, address information is held in the first address holding means during a predetermined address holding period from the timing point at which address information is stored in the first address holding means. After a predetermined period is passed since the address information is supplied to the first address holding means, this time, the address information is supplied to the second address holding means and the address information is held by the second address holding means during a predetermined address holding period.

Similarly, after a predetermined period is passed since the address information was supplied to the (n–1)th address holding means, the address information is supplied to the n-th address holding means, and the address information is held in the n-th address holding means during a predetermined address holding period.

On the other hand, each data holding means first data in the data row during a predetermined period within the period during which address information is held by the first address holding means, and after a predetermined period is passed, this time, second data is stored in each data holding means. Since this data holding means is a period included in the address holding period in the second address holding means, during this period of time, address information held in the first address holding means is held in the second address holding means.

Similarly, during a predetermined period within the period in which address information is held in the n–1th address holding means, n–1th data is held in each data holding means. During a predetermined period is passed, this time, n-th data is held in each data holding means. Since this data holding period is a period included in the address holding period at the n-th address holding means, during this period, address information stored in the n−1th address holding means is held in the n-th address holding means.

As a result, during a period in which the first data is held in each data holding means, the write control circuit write-activates the first data storing means so that the first data stored in the first data holding means is stored in the storage area of the first data storage means at its storage address shown by the address information held in the first address holding means.

During a period in which second data is held in each data holding means, this time, the write control circuit write-activates the second data storing means so that second data stored in the second data holding means is stored in the storage area in the second data storing means at its storage address shown by the address information held in the second address holding means.

Similarly, during a period in which n-th data is held in each data holding means, the write control circuit write-activates the n-th data storing means so that n-th data held in the n-th data holding means is stored in the storage area ion the n-th data storing means at its storage address shown by the address information held in the n-th address holding means.

According to the above-mentioned operations, the n-th data, the second data, . . . , n-th data comprising continuous large capacity data row are stored in the first data storage means, the second data storage means, . . . , the n-th data storage means at every predetermined period, respectively.

As described above, even when the period in which the address signals are supplied to the data storing means (corresponding to the periods in which the address signals are stored in the corresponding data holding means) are set to be long periods in accordance with the respective data storing means, the timings at which data are written in the respective data storing means can be made the same as the timing at which data are supplied to the respective data holding means. As a result, consecutive data row of large amount can be transmitted at high speed to the respective data storing means in parallel without extending the time base. Therefore, the data holding means for holding the data transmitted at high speed until the end of the data row for a long period of time need not be provided, and hence the circuit arrangement can be simplified.

According to the present invention, there is provided a data reading apparatus which is comprised of a plurality of address holding means provided in response to a plurality of data storing means, receiving address information indicative of storage address of each data shifted at every predetermined period and holding the address information during a predetermined address holding period from a time point at which address information is supplied, and read control means for read-activating a data storing means corresponding to an address holding means to which address information is supplied during a predetermined delay time is passed since address information was supplied, wherein a read-activation period relative to the data storing means is included in an address holding period at the address holding means corresponding to the data storing means, and the read-activated data storing means outputs data from a storage position shown by address information held in a corresponding address holding means.

Accordingly, storage address data of data stored in each data storing means are shifted and supplied to a plurality of address holding means and each address holding means holds supplied address information during a predetermined address holding period from a time point at which address information was supplied.

Of the address holding means, the data storing means corresponding to the address holding means supplied with address information is read-activated by the read control circuit after a predetermined delay time since the address information was supplied. In this case, since the read-activation period relative to one data storing means is included in the address holding period of the address holding means corresponding to the data storing means, at the time the data storing means is read-activated, the storage address data for reading data from the data storing means is held in the address holding means corresponding to the data storing means. Accordingly, since the data storing means is read-activated by the read control circuit, data is read out from the storage area at its storage address shown by the address information held in the corresponding address holding means.

Specifically, having examined respective address holding means, it is to be noted that the address information is held in the first address holding means during a predetermined address holding period since the address information was stored in the first address holding means. After a predetermined period is passed since the address information was supplied to the first address holding means, this time, the address information is supplied to the second address holding means, and the address information is held by the second address holding means during a predetermined address holding period.

Similarly, after a predetermined period is passed since the address information was supplied to the (n−1)the address holding means, the address information is supplied to the n-th address holding means, and the address information is held by the n-th address holding means during a predetermined address holding period.

Then, after a predetermined delay time period is passed since the address information was supplied to the first address holding means, the first data storing means is read-activated by the read control circuit, whereby data is read out from the first data storing means at its storage address shown by the address information held in the first address holding means.

After a predetermined time is passed since the address information was supplied to the first address holding means, the address information is supplied to the second address holding means. After a predetermined delay time period is passed since the address information was supplied, the second data storing means is read-activated by the read control circuit, whereby data is read out from the second data storing means at its storage address shown by the address information held in the second holding means. The time point in which data is started to be read out is a time point delayed by a predetermined period from the time point at which the data is started to be read out from the first data storing means.

Similarly, after a predetermined time is passed since the address information was supplied from the n−1th address holding mean, the address information is supplied to the n-th address holding means, After a predetermined time is passed since the address information was supplied, this time, the n-th data storing means is read-activated by the read control circuit, whereby data is read out from the n-th data storing means at its storage address shown by the address information held in the n-th address holding means.

In this case, if the read activation period for each data storing means is made the same as the predetermined period (shift period of the address information relative to each address holding means) by the read control circuit, then first data, second data, . . . , n-th data are respectively read out from the first data storing means, the second data storing means, . . . , the n-th data storing means. As a result, this becomes equivalent to the fact that continuous data row of large capacity of the first data, the second data, . . . , the n-th data are read out.

As described above, even when the period in which address information is supplied to each data storing means (corresponding to the period in which address information is held by the corresponding address holding means) is set to be longer in accordance with each data storing means, the timing at which data is read out from each data storing means can be reduced as compared with the supplying period of address information, and hence the continuous data row of large capacity can be transmitted at high speed without expanding a time base. Therefore, data holding means and data transmitting means for holding data read out from the respective data storing means until the end of the data row and then transmitting the same need not be provided, and hence the circuit arrangement can be simplified.

Furthermore, according to the present invention, there is provided a data transmission apparatus which is comprised of a plurality of data holding means provided in response to a plurality of data storing means, sequentially receiving individual data to be stored in each data storing means at every predetermined period, and holding supplied data during the predetermined period, a plurality of address holding means provided in response to a plurality of data storing means, receiving address information indicative of storage address of each data shifted at every predetermined period and holding supplied address information during a predetermined address holding period from a time point at which address information is supplied, write control means for write-activating a plurality of data storing means at its data storing means to which data stored in the data holding means is to be stored, and read control means for read-activating a data storing means corresponding to an address holding means supplied with address information after a predetermined delay time since a time point at which address information was supplied, wherein a data holding period in the data holding means is included in an address holding period in an address holding means corresponding to the data holding means, the write-activated data storing means stores data held in a corresponding data holding means at a storage position shown by address information held in a corresponding address holding means, a read-activation period relative to the data storing means is included in an address holding period corresponding to the data storing means, and said read-activated data storing means outputs data from a storage position shown by address information held in a corresponding address holding means.

Initially, a data write operation will be described. Storage addresses of data to be stored in each data storing means are shifted and supplied to the n address holding means at every predetermined period, and each address holding means holds supplied address, information during a predetermined period from the time point in which address information was supplied.

On the other hand, individual data to be stored in each data storing means are sequentially supplied to a plurality of data holding means and data supplied to each data holding means are held by each data holding means during the predetermined period of time.

Of a plurality of data storing means, a data storing means in which data to be held by a plurality of data holding means are stored is write-activated by the write control circuit. In this case, since the period in which data is held in one data holding means is included in the address holding period, at the time the data storing means is write-activated, the storage address to the data storing means is held in the address holding means corresponding to the data storing means. Accordingly, the data storing means is write-activated so that data held in the corresponding data holding means is written in the storage area at its storage address shown by the address information held in the corresponding address holding means.

An operation for reading data will be described. Storage addresses of data stored in the data storing means are shifted and supplied to a plurality of address holding means at every predetermined period and the address holding means hold supplied address information during a predetermined address holding period since address information was supplied.

A data storing means corresponding to the address holding means in the address holding means to which the address information is supplied is read-activated by the read control circuit after a predetermined delay time since the address information was supplied. In this case, since the period in which one data storing mean is read-activated is included in the address holding period by the address holding means corresponding to the data storing means, at the time the data storing means is read-activated, storage address of data read out from the data storing means is held in the address holding means corresponding to the data storing means. Accordingly, the data storing means is read-activated by the read control circuit so that data is read out from the storage area at its storage address shown by the address information held in the corresponding address holding means.

As described above, in the data writing operation, even when the period in which address information is supplied to the data storing means (corresponding to the period during which address information is held in the corresponding address holding means) is set to be long in accordance with the data storing means, the write timing of data stored in the data storing means can be made the same as the timing at which data is supplied to the data holding means so that continuous large capacity data row supplied at high speed can be parallelly supplied to the data storing means without expanding the time base. Therefore, new data holding means for holding a large amount of data transmitted at high speed for a long period of time until the end of data row need not be provided.

On the other hand, in the data read operation, even when the period in which address information is supplied to the data storing means (corresponding to the period during which address information is held in the corresponding address holding means) is set to be long in accordance with the data storing means, the timing at which data is read out from the data storing means can be made shorter than the period during which the address information is supplied so that continuous large capacity data row can be transmitted at high speed without expanding the time base. Therefore, new data holding means and new data transmitting means for holding data read out from the data storing means until the end of the data row and then transmitting them at high speed need not be provided.

BRIEF DESCRIPTION OF THE DRAWINGS

FIG. 9A–9O is a timing chart showing a write processing of the disk cache shown in FIG. 8; and FIG. 10A–10T is a timing chart showing a read processing in the disk cache shown in FIG. 8.

DETAILED DESCRIPTION OF THE PREFERRED EMBODIMENTS

Disk caches according to first and second embodiments of the present invention in which a data transmission apparatus comprising a combination of a data storage device and a data reading apparatus according to the present invention is applied to the disk cache will be described with reference to FIGS. 4 through 10.

Figure 4:
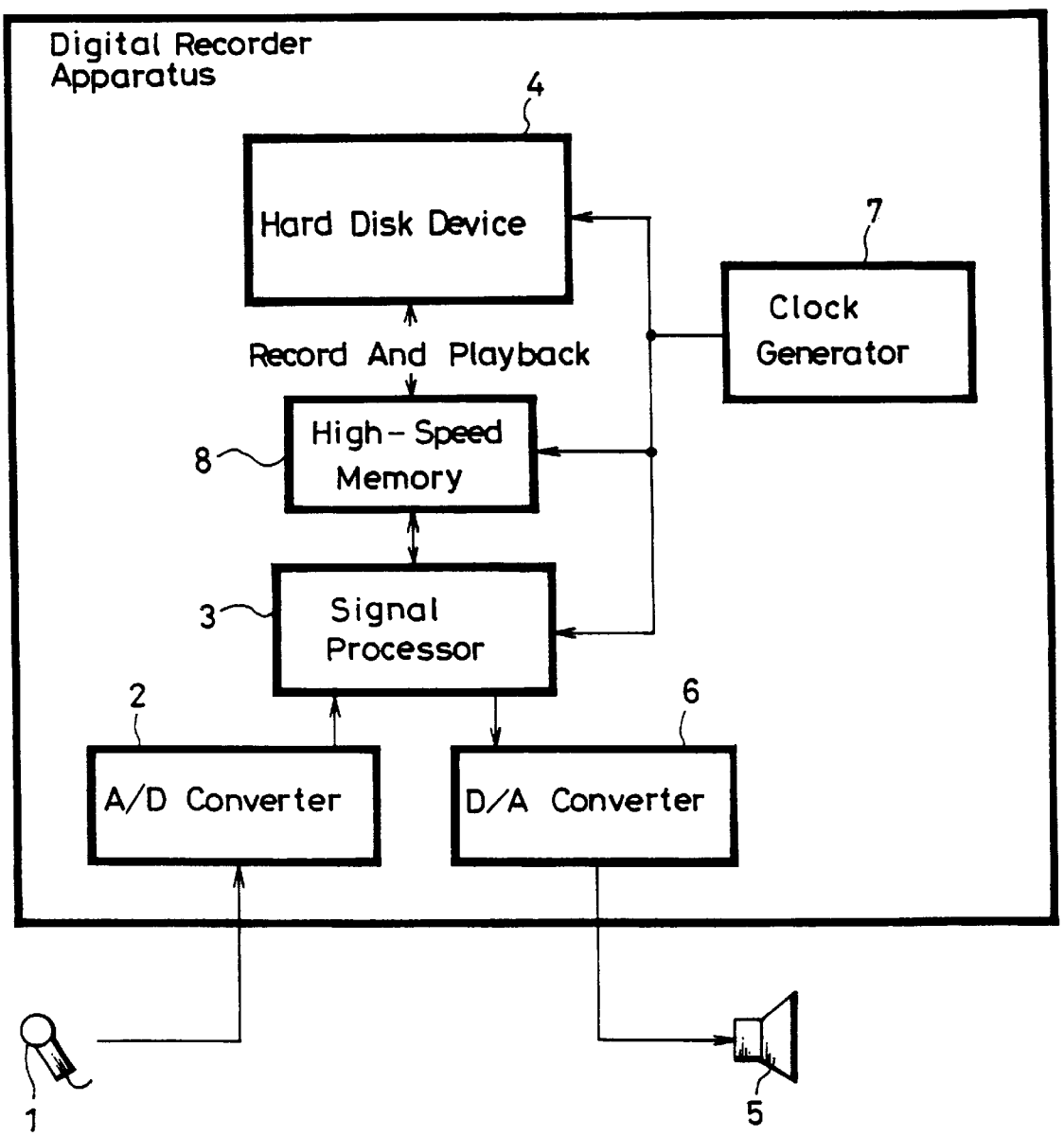
FIG. 4 is a block diagram showing a digital recorder apparatus using a storage device and a data reading apparatus according to an embodiment of the present invention.

The disk caches according to the first and second embodiments are incorporated in a digital recorder apparatus as shown in FIG. 4 when in use.

As shown in FIG. 4, this digital recorder apparatus comprises an analog-to-digital (A/D) converter 2 for converting an audio signal inputted through a microphone 1 to digital audio data, a signal processor 3 for effecting various signal processings such as addition of error-correcting codes on the audio data from the A/D converter 2, a hard disk device 4 for recording or reproducing the audio data in or from a recording medium such as a magnetic disk or magneto-optical disk incorporated therein, a digital-to-analog (D/A) converter 6 for converting the audio data from the signal processor 3 into an analog audio signal and outputting the analog audio signal to a speaker 5 and a clock generator 7 for generating a reference clock for establishing timing concerning signal processings in various circuits mentioned above.

Then, the disk cache 8 according to this embodiment is connected between the signal processor 3 and the hard disk device 4 through a data bus. A control bus is connected between the signal processor 3 and the disk cache 8 and a data write request signal and a data read request signal are outputted from the signal processor 3 through this control bus.

Figure 6:
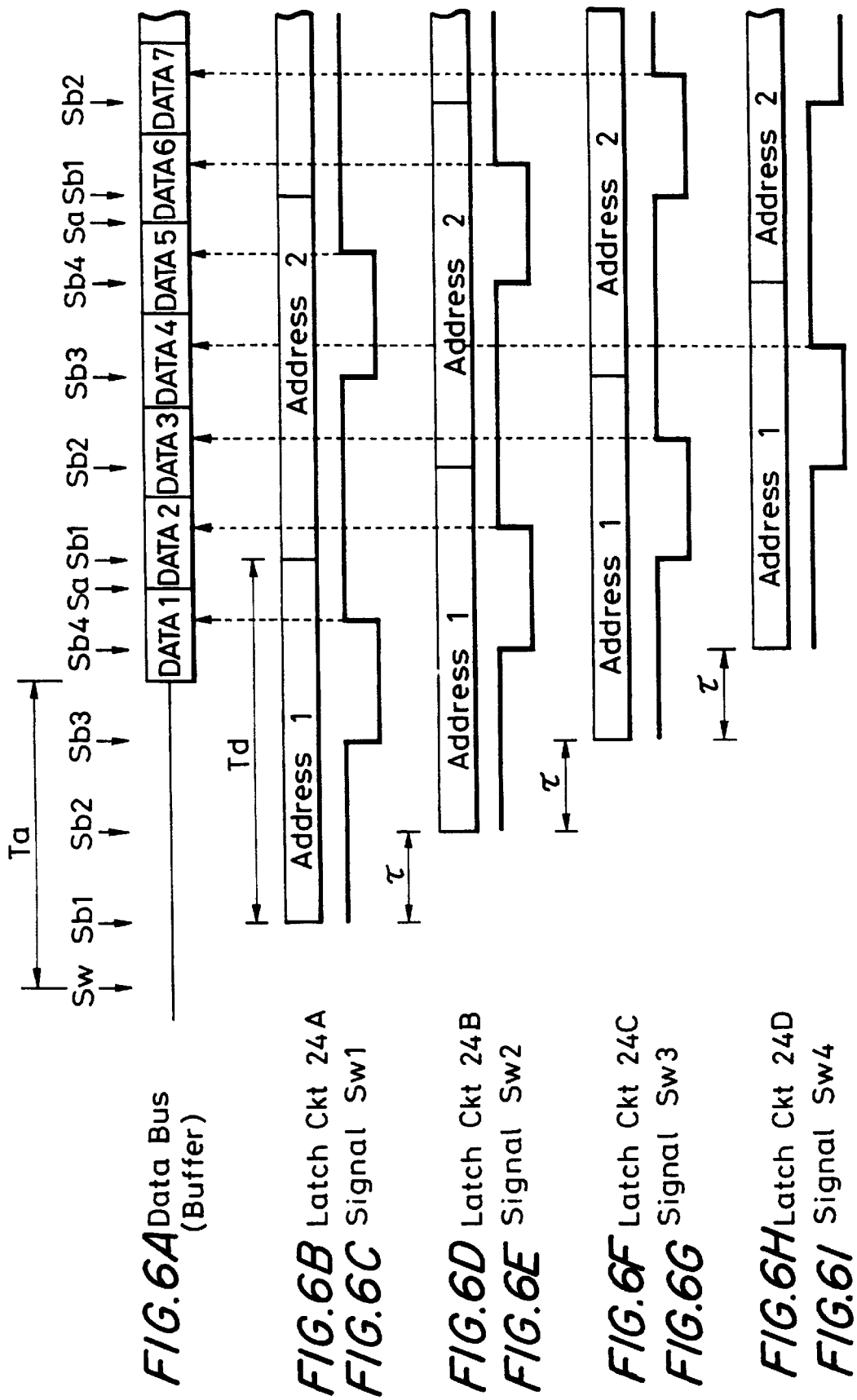
FIG. 6A–6I is a timing chart showing a write processing in the disk cache shown in FIG. 5.

The signal processor 3 transmits data row after a predetermined time was passed since the data write request signal has been outputted, in particular, when data row is written. This timing is determined based on the count of the reference clock from the clock generator 7. Accordingly, as shown in FIG. 6, for example, after a predetermined time period Ta since the data write request signal has been outputted, data row is outputted from the signal processor 3 through the data bus.

An outline of the disk cache 8 according to this embodiment will be described. When the access speed of memory is lower than a data transfer rate on the data bus, the access speed can be compensated by connecting a plurality of memories in parallel. In particular, when data is written in the memories, write data need not be stored over the whole memory access time and write data may be stored during before and after necessary timing.

Figure 1:
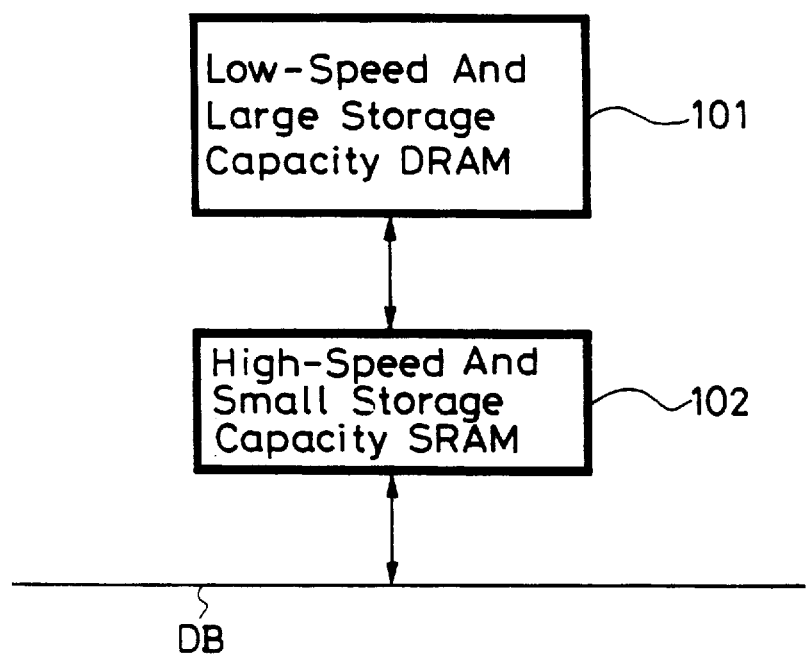
FIG. 1 is a block diagram schematically showing an example of data storage and reading device using a small storage capacity SRAM.
Figure 2:
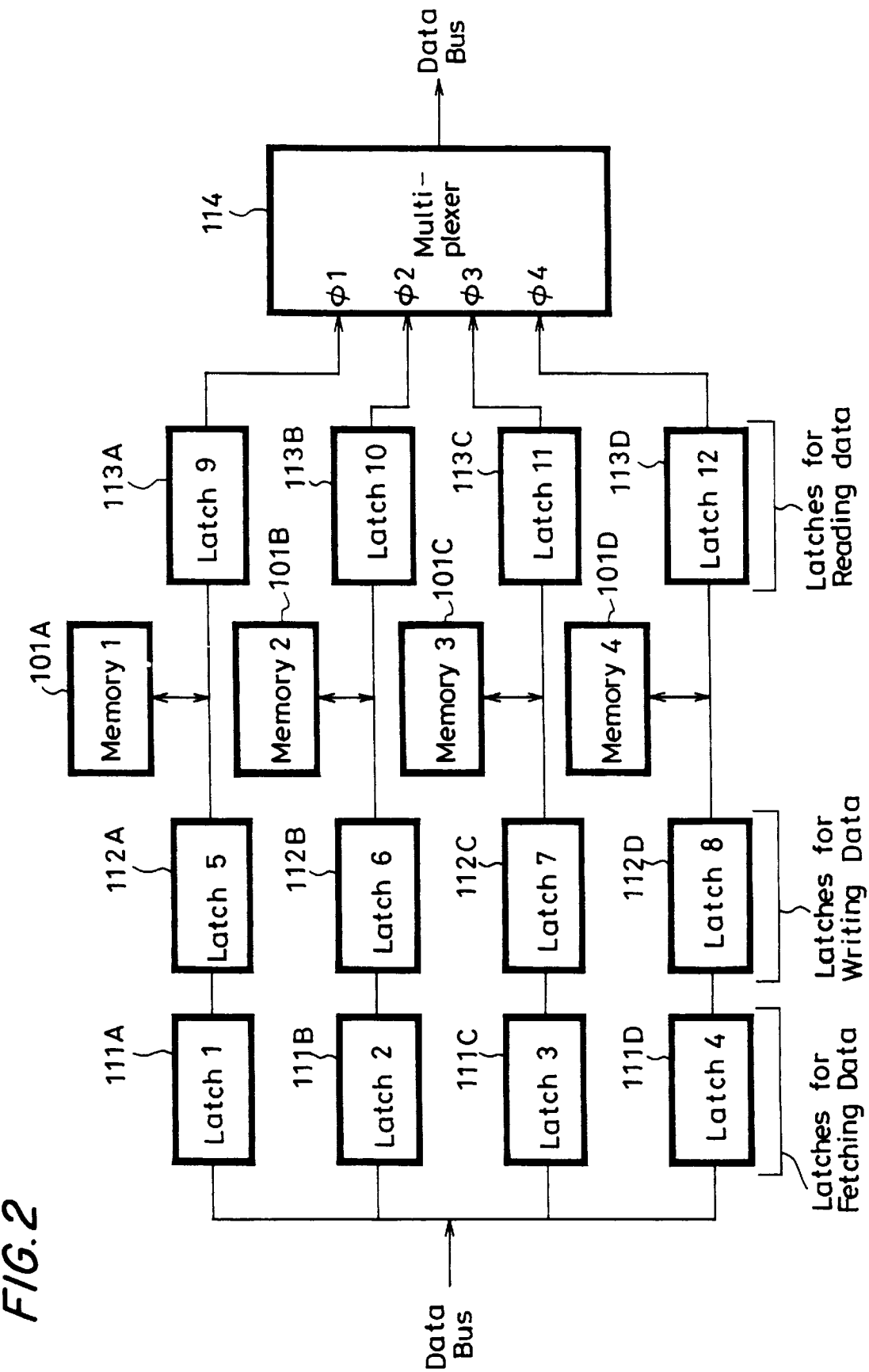
FIG. 2 is a block diagram showing an example of a disk cache using four DRAMs.
Figure 3:
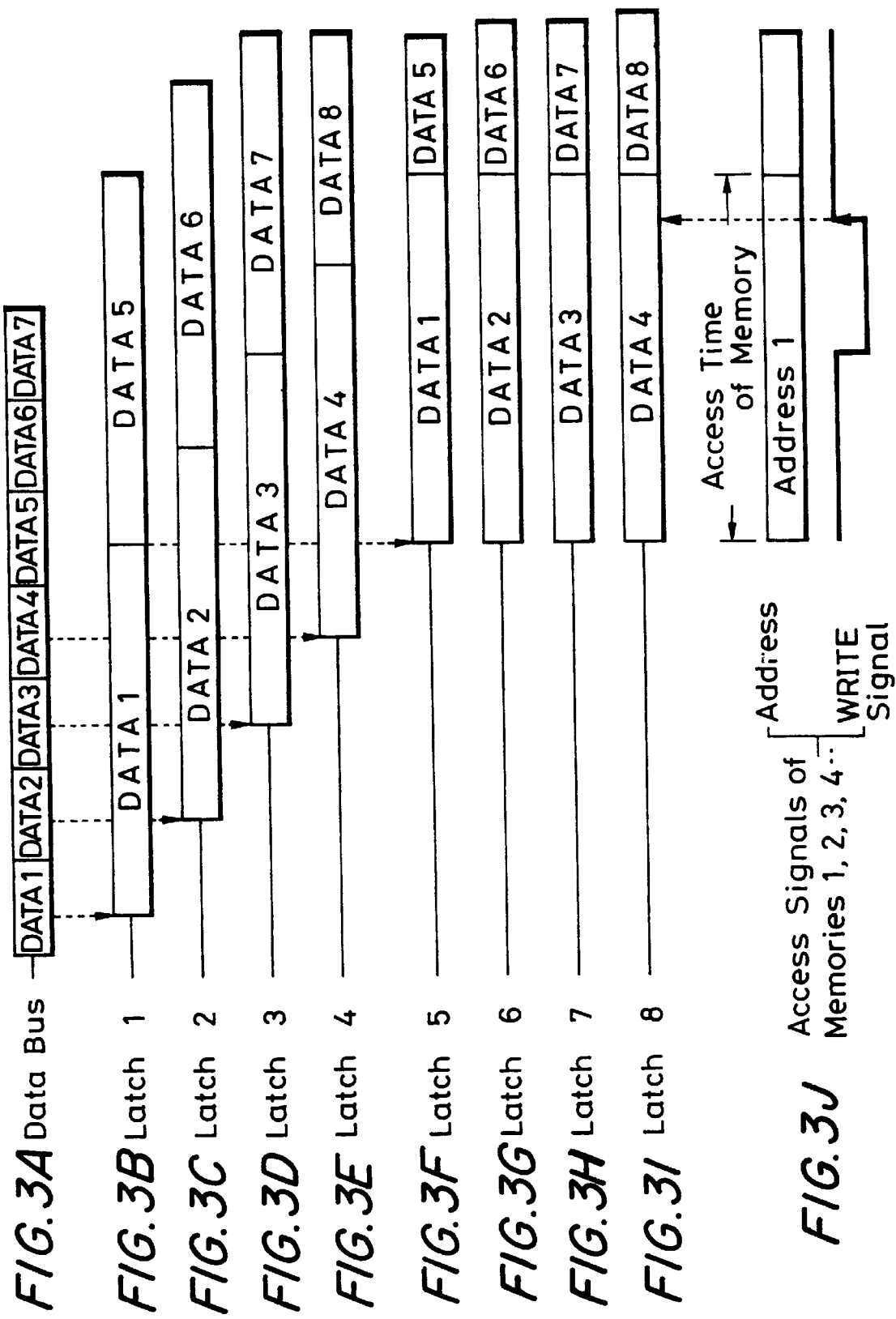
FIG. 3A–3J is a timing chart showing a write processing in the disk cache shown in FIG. 2.

As will be described later on, although the memories are connected in parallel depending on the ratio between the access speed and the data transfer rate, latch circuits (e.g., circuits corresponding to the fifth to eighth latch circuits 112A to 112D shown in FIG. 2) for storing data can be removed by shifting the access timings.

Figure 5:
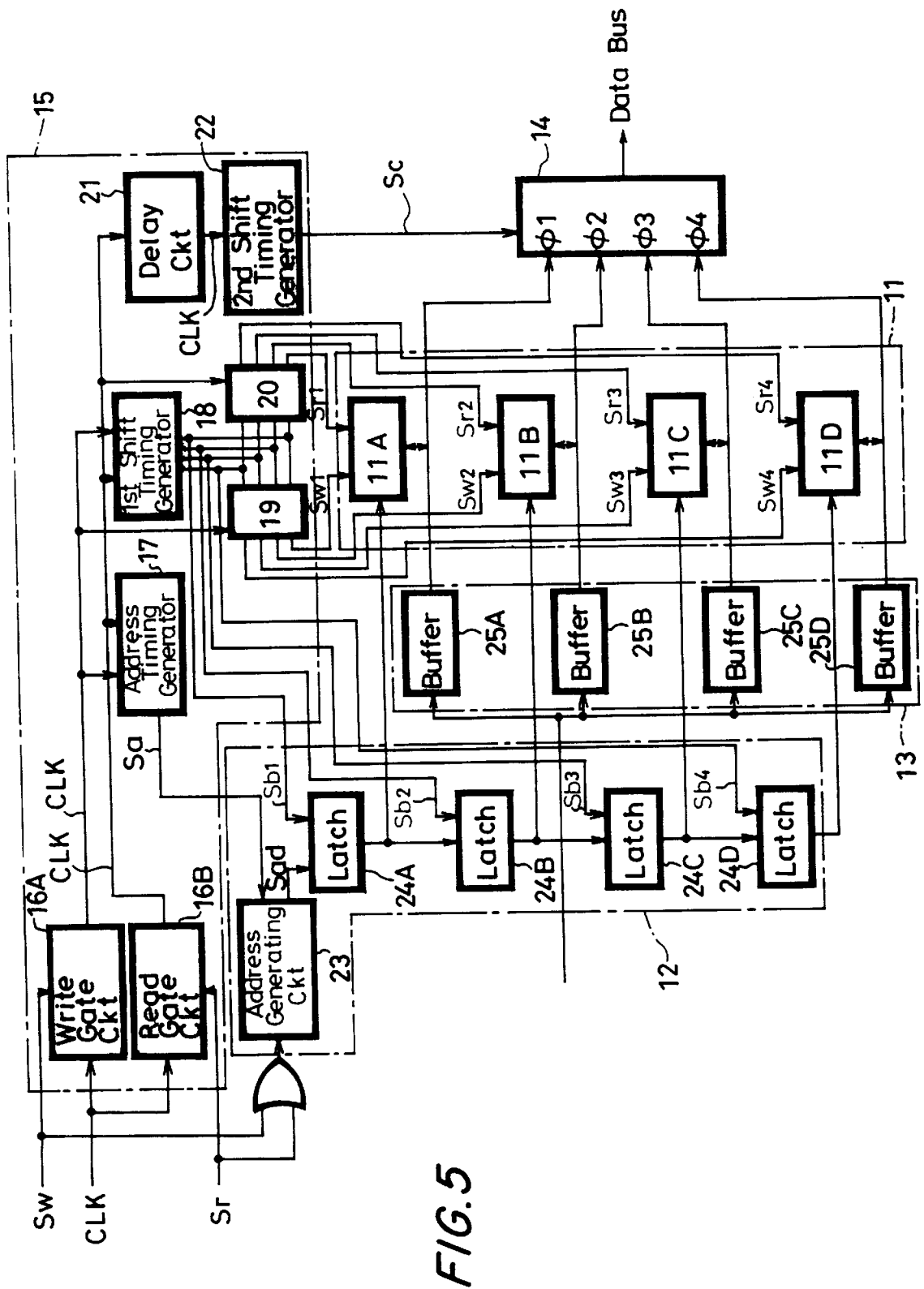
FIG. 5 is a block diagram showing a disk cache comprising a data storage device and a data reading apparatus according to an embodiment of the present invention.

A specific arrangement of the disk cache 8 according to this embodiment will be described. As shown in FIG. 5, the disk cache 8 according to the first embodiment comprises a data storage unit 11, an address storing unit 12, a data storing unit 13, a multiplexer 14 and a timing generating unit 15.

The storage unit 11 comprises a plurality of memories 11A to 11D. The number of the memories 11A to 11D is determined by the ratio between the access speeds of the memories 11A to 11D and the data transfer rate on the data bus, and the memories 11A to 11D are connected in parallel. In this embodiment, since the access speed of each of the memories 11A to 11D is about ¼ of the data transfer rate, four memories 11A to 11D are connected in parallel to construct the data storage unit 11. Each of the memories 11A to 11D is composed of an ordinary memory (e.g., memory including a specific memory such as DRAM or SRAM from a high-order concept standpoint).

The timing generating unit 15 comprises a write gate circuit 16A for allowing a reference clock CLK to be entered from the clock generator 7 (see FIG. 4) based on a write request signal Sw from the signal processor 3 (see FIG. 4), a read gate circuit 16B for allowing the reference clock CLK to be entered from the clock generator 7 based on a read request signal Sr from the signal processor 3 and various timing generators.

The various-timing generator comprises an address timing generator 17 for counting the reference clock CLK entered from the write gate circuit 16A or the read gate circuit 16B and outputting an updating signal Sa to the address generating unit 12, which will be described later on, at the time it counts a first predetermined number of clocks and a first shift timing generator 18 for counting the reference clock CLK from the write gate circuit 16A or the read gate circuit 16B and sequentially outputting first to fourth enable signals Sb1 to Sb4 (pulse signals whose phases are shifted during periods corresponding to transfer rates) each time it counts the number of clocks corresponding to the data transfer rate.

The timing generating unit 15 includes, in addition to the two timing generators 17 and 18, a write timing generator 19 for counting the reference clock CLK from the write gate circuit 16A based on the first to fourth enable signals Sb1 to Sb4 from the first shift timing generator 18 and outputting first to fourth write enable signals Sw1 to Sw4 whose phases are shifted by the periods corresponding to the transfer rates, a read timing generator 20 for counting the number of reference clock CLK from the read gate circuit 16B based on the first to fourth enable signals Sb1 to Sb4 from the first shift timing generator 18 and outputting first to fourth read enable signals Sr1 to Sr4 whose phases are shifted by the periods corresponding to the transfer rates, a delay circuit 21 for delaying the reference clock CLK outputted from the read gate circuit 16B by a predetermined period Td and a second shift timing generator 22 for counting the number of the reference clock CLK from the delay circuit 21 and outputting a sequence signal Sc to the multiplexer 14 at the time it counts the number of clocks corresponding to the data transfer rate.

The address storing unit 12 comprises an address generating circuit 23 and four latch circuits 24A to 24D in correspondence with the four memories 11A to 11D. The address generating circuit 23 has a control bus led out from the signal processor 3 and generates an address signal Sad whose content is sequentially updated at every first predetermined period, i.e., each time the updating signal Sa from the address timing generator 17 is inputted based on the data write request signal or the data read request signal from the signal processor 3. The address signal Sad is inputted to the first latch circuit 24A.

The four latch circuits 24A to 24D are connected in series and receive and store the address signals Sad stored in the latch circuits 24A to 24C of the preceding stage based on the second to four enable signals Sb2 to Sb4 from the first shift timing generator 18 during a predetermined period Td. The first latch circuit 24A receives and stores the address signal Sad outputted from the address generating circuit 23 based on the first enable signal Sb1 during the predetermined period Td.

The output line of the latch circuits 24A to 24D are connected to the corresponding memories 11A to 11D, and the address signals stored in the latch circuits 24A to 24D are also applied to the corresponding memories 24A to 24D.

The data storing unit 13 comprises four buffers 25A to 25D in association with the four memories 11A to 11D, and a data bus is commonly connected to the input terminals of the buffers 25A to 25D. Four internal buses are connected to the output terminals of the buffers 25A to 25D. These four internal buses are connected to the corresponding memories 11A to 11D, and also connected to the first to fourth input terminals φ1 to φ4 of the multiplexer 14, respectively. The first to fourth buffers 25A to 25D are used to separate data obtained in the write operation in the first to fourth memories 11A to 11D and data obtained in the read operation in the first to fourth memories 11A to 11D from each other. When data is written in the first to fourth memories 11A to 11D, the first to fourth buffers 25A to 25D are turned on. When data is read out from the first to fourth memories 11A to 11D, the first to fourth buffers 25A to 25D are turned off (buffer output is held at high impedance state).

The first to fourth memories 11A to 11D write data stored in the corresponding buffers 25A to 25D in storage addresses shown by the address signals Sad stored in the corresponding latch circuits 24A to 24D based on the first to fourth write enable signals Sw1 to Sw4 from the write timing generator 19.

The first to fourth memories 11A to 11D read data from the storage addresses shown by the address signals Sad stored in the corresponding latch circuits 24A to 24D based on the first to fourth read enable signals Sr1 to Sr4 from the read timing generator 18 and output the thus read out data to the multiplexer 14 of the succeeding stage.

The multiplexer 14 sequentially transmits the data supplied to the first to fourth input terminals φ1 to φ4 from the first to fourth memories 11A to 11D through the output terminal to the data bus based on the sequence signal Sc from the second shift timing generator 22.

Figure 7:
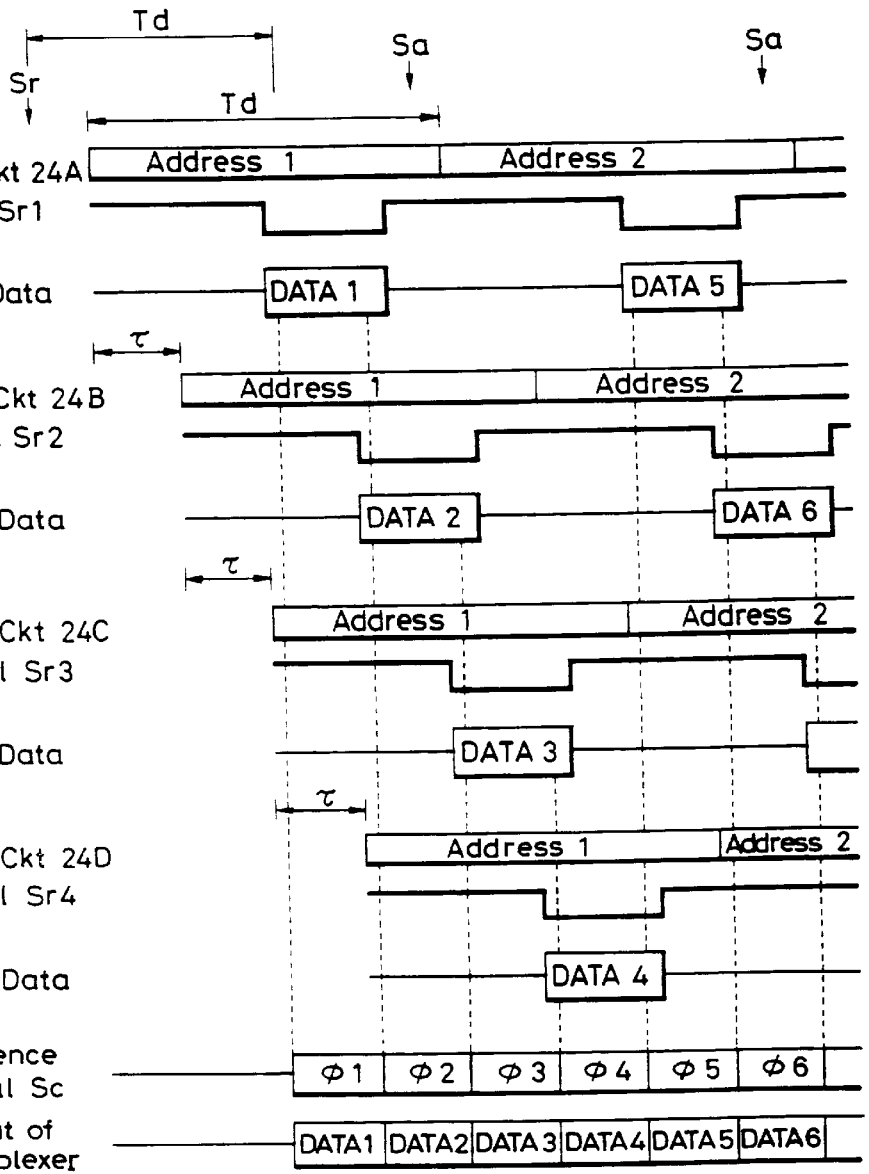
FIG. 7A–7N is a timing chart showing a read processing in the disk cache shown in FIG. 5.

A signal processing operation of the disk cache according to the first embodiment, in particular, a signal processing operation in which the data row transmitted from the signal processor 3 through the data bus is transmitted to the hard disk device 4 side through the data bus by the disk cache 8 according to this embodiment will be described with reference to timing charts shown in FIGS. 6 and 7.

The data write processing will be described initially with reference to FIG. 6. Based on the input of the write request signal Sw transmitted from the signal processor 3 (see FIG. 4) through a control bus to the address generating circuit 23, the address generating circuit 23 generates the address signal Sad (address 1) and outputs the same to the first latch circuit 24A. The first latch circuit 24A receives the address signal Sad from the address generating circuit 23 based on the first enable signal Sb1 from the first shift timing generator 18 and stores the same during the predetermined period Td. This predetermined period Td is a period during which the first enable signal Sb1 is outputted from the first shift timing generator 18 to the first latch circuit 24A one more time. During the period Td in which the address signal Sad is stored, the address signal Sad stored in the first latch circuit 24A is applied to the first memory 11A through the output line.

The first enable signal Sb1 from the first shift timing generator 18 is also supplied to the write timing generator 18, whereby the write enable signal Sw1 is outputted from the write timing generator 19 and inputted to the first memory 11A. The write enable signal Sw1 has a signal waveform which falls after a predetermined period at the time it is outputted and which rises after a predetermined pulse width period. At the leading edge of this write enable signal Sw1, the first memory 11A is activated. The leading edge of the first write enable signal Sw1 is included in the period Td during which the address signal Sad is stored in the first latch circuit 24A.

At the time after a period r corresponding to the data transfer rate since the first enable signal Sb1 was outputted to the first latch circuit 24A, a second enable signal Sb2 is outputted from the first shift timing circuit 18 to the second latch circuit 24B. The second latch circuit 24B receives the address signal Sad (address 1) stored in the first latch circuit 24A based on the input of the second enable signal Sb2 and stores the same during the predetermined period Td. The second enable signal Sb2 is also supplied to the write timing generating circuit 18, whereby a second write enable signal Sw2 is outputted from the write timing generator 19 and inputted to the second memory 11B. Also in this case, at the leading edge of the write enable signal Sw2 included in the period Td during which the address signal Sad is stored in the second latch circuit 24B, the second memory 11B is activated.

At the time after the period r corresponding to the data transfer rate since the second enable signal Sb2 was outputted to the second latch circuit 24B, a third enable signal Sb3 is outputted from the first shift timing circuit 18 to the third latch circuit 24C. The third latch circuit 24C receives the address signal Sad (address 1) stored in the second latch circuit 24B based on the input of the third enable signal Sb3 and stores the same during the predetermined period Td. The third enable signal Sb3 is also supplied to the write timing generator 19, whereby the third write enable signal Sw3 is outputted from the write timing generator 19 and inputted to the third memory 11C. Also in this case, at the leading edge of the write enable signal Sw3 included in the period Td during which the address signal Sad is stored in the third latch circuit 24C, the third memory 11C is activated.

At the time after the period r corresponding to the data transfer rate since the third enable signal Sb3 was outputted to the third latch circuit 24C, a fourth enable signal Sb4 is outputted from the first shift timing circuit 18 to the fourth latch circuit 24D. The fourth latch circuit 24D receives the address signal Sad (address 1) stored in the third latch circuit 24C based on the input of the fourth enable signal Sb4 and stores the same during the predetermined period Td. The fourth enable signal Sb4 is also supplied to the write timing generator 19, whereby the fourth write enable signal Sw4 is outputted from the write timing generator 19 and inputted to the fourth memory 11D. Also in this case, at the leading edge of the write enable signal Sw4 included in the period Td during which the address signal Sad is stored in the fourth latch circuit 24D, the fourth memory 11D is activated.

Of data row outputted from the signal processor 3, in the input timings of the first data DATA1 to the first to fourth buffers 25A to 25D, the first data DATA1 is inputted at substantially the intermediated timing point of the pulse width from the trailing edge to the leading edge of the first write enable signal Sw1. The above pulse width is set such that the leading edge of the pulse width is included in the period τ corresponding to the transfer rate of the first data DATA1. During the period τ corresponding to the transfer rate of the first data DATA1, the first data DATA1 is stored in the first to fourth buffers 25A to 25D.

Therefore, at the time in which the pulse width of the first write enable signal Sw1 falls, the first memory 11A is activated, the address signal Sad (address 1) stored in the first latch circuit 24A is latched in the first latch circuit 11A through the output line, and the first data DATA1 stored in the first buffer 25A is latched in the first memory 11A through the internal bus. In this first memory 11A, the first data DATA1 latched from the internal bus is written in the storage area at its storage address shown by the address signal Sad (address 1) from the first latch circuit 24A.

After a predetermined period since the enable signal Sb2 was outputted to the second latch circuit 24B, the second write enable signal Sw2 falls. At substantially the intermediate time of the predetermined pulse width after the second write enable signal Sw2 fell, second data DATA2 in the data row is inputted to the buffers 25A to 25D and the data DATA2 is stored in the buffers 25A to 25D during the predetermined period. At the time the pulse width rises (after the period τ corresponding to the data transfer rate from the leading edge of the pulse width of the first write enable signal Sw1 was passed), the second memory 11B is activated, the address signal Sad (address 1) stored in the second latch circuit 24B is latched in the second memory 11B through the output line and the second data DATA2 stored in the second buffer 25B is latched in the second memory 11B through the internal bus. In the second memory 11B, the second data DATA2 latched from the internal bus is written in the storage area at its storage area shown by the address signal Sad (address 2) from the second latch circuit 24B.

After a predetermined period since the enable signal Sb3 was outputted to the third latch circuit 24C, the third write enable signal Sw3 falls. At substantially the intermediate time of the predetermined pulse width after the third write enable signal Sw3 fell, third data DATA3 in the data row is inputted to the buffers 25A to 25D and the data DATA3 is stored in the buffers 25A to 25D during the predetermined period. At the time the pulse width rises (after the period τ corresponding to the data transfer rate from the leading edge of the pulse width of the second write enable signal Sw2 was passed), the third memory 11C is activated, the address signal Sad (address 1) stored in the third latch circuit 24C is latched in the third memory 11C through the output line and the third data DATA3 stored in the third buffer 25C is latched in the third memory 11C through the internal bus. In the third memory 11C, the third data DATA3 latched from the internal bus is written in the storage area at its storage area shown by the address signal Sad (address 1) from the third latch circuit 24C.

After a predetermined period since the enable signal Sb4 was outputted to the fourth latch circuit 24D, the fourth write enable signal Sw4 falls. At substantially the intermediate time of the predetermined pulse width after the fourth write enable signal Sw4 fell, fourth data DATA4 in the data row is inputted to the buffers 25A to 25D and the data DATA3 is stored in the buffers 25A to 25D during the predetermined period. At the time the pulse width rises (after the period τ corresponding to the data transfer rate from the leading edge of the pulse width of the third write enable signal Sw3 was passed), the fourth memory 11D is activated, the address signal Sad (address 1) stored in the fourth latch circuit 24D is latched in the fourth memory 11D through the output line and the fourth data DATA4 stored in the fourth buffer 25D is latched in the fourth memory 11D through the internal bus. In the fourth memory 11D, the fourth data DATA4 latched from the internal bus is written in the storage area at its storage area shown by the address signal Sad (address 1) from the fourth latch circuit 24D.

Before the time period Td in which the address signal Sad is stored in the first latch circuit 24A is passed, the address timing generating circuit 17 outputs the updating signal Sa to the address generating circuit 23 so that the address generating circuit 23 an address signal Sad (address 2) in which stored address is incremented by +1 based on the input of the updating signal Sa and output the thus generated address signal Sa to the first latch circuit 24A.

Based on the first enable signal Sb1 outputted from the first shift timing signal generator 18 one more time, the first latch circuit 24A receives the updated address signal Sad (address 2) from the address generating circuit 23 and stores the same during the predetermined period Td. At the time the first enable signal Sb1 is inputted, the write timing generating circuit 19 outputs the first write enable signal Sw1 having a predetermined signal waveform (signal waveform which falls after a predetermined period and which rises after a predetermined pulse width period) to the first memory 11A.

At substantially the intermediate time of the pulse width of the first write enable signal Sw1, fifth data DATA5 in the data row is inputted to the buffers 25A to 25D and the buffers 25A to 25D store the fifth data DATA5 during a predetermined period of time.

At the time the pulse Width of the write enable signal S2w1 rises, the first memory 11A is activated again, the address signal Sad (address 2) stored in the second latch circuit 24A is latched in the first memory 11A through the output line, and the first data DATA1 stored in the first buffer 25A is latched in the first memory 11A through the internal bus. Then, in the first memory 11A, the fifth data DATA5 latched from the internal bus is written in the storage area at its storage address shown by the address signal Sad (address 2) from the first latch circuit 24A.

Similarly, sixth data in the data row is written in the second memory 11B, seventh data DATA7 is written in the third memory 11C, and eighth data DATA8 is written in the fourth memory 11D.

In general, 4n+1th (n=0, 1, 2, . . . ) data is written in the storage area of the first memory 11A at its address shown by the address signal Sad stored in the first latch circuit 24A, 4n+2th data is written in the storage area of the second memory 11B at its address shown by the address signal Sad stored in the second latch circuit 24B, 4n+3th data is written in the storage area of the third memory 11C at its address shown by the address signal Sad stored in the third latch circuit 24C, and 4n+4th data is written in the storage area of the fourth memory 11D at its address shown by the address signal Sad stored in the fourth latch circuit 24D.

As described above, in the data write processing, even when the period in which the address signals Sad are applied to the first to fourth memories 11A to 11D (corresponding to the periods Td in which the address signals Sad are stored in the first to fourth latch circuits 24A to 24D) are set to be long periods in accordance with the access speeds to the memories 11A to 11D, the timings at which data are written in the first to fourth memories 11A to 11D can be made the same as the timings at which data are supplied to the first to fourth buffers 25A to 25D (data transfer rate). As a result, consecutive data row of large amount supplied at high speed through the data bus can be supplied to the first to fourth memories 11A to 11D in parallel without extending the time base.

Therefore, the data storing circuits such as buffers for storing a large number of data transmitted at high speed until the end of the data row for a long period of time need not be provided, and hence the circuit arrangement can be simplified.

Specifically, in the first embodiment, since timings at which data are written in the first to fourth memories 11A to 11D are shifted by each period r corresponding to the data transfer rate and consecutive data inputted to the first to fourth buffers 25A to 25D are written in the first to fourth memories 11A to 11D, the timings at which the data are written in the first to fourth memories 11A to 11D can be made coincident with the data transfer rate. In addition, the data storing circuit for storing data to be written in the first to fourth memories 11A to 11D need not be provided.

Since the access timing is shifted by the period τ corresponding to the data transfer rate, the first to fourth latch circuit 24A to 24D for storing the address signals Sad concerning the first to fourth memories 11A to 11D are required. However, in this case, the word length of the address signal Sad is shorter than the word length of data so that latch circuits with small bit number may be used and the overall circuit scale may be reduced.

The data read processing will be described with reference to FIG. 7. Based on the read request signal Sr transmitted from the signal processor 3 to the address generating circuit 23 through the control bus, the address generating circuit 23 generates the address signal Sad (address 1) and outputs the same to the first latch circuit 24A. The first latch circuit 24A receives the address signal Sad (address 1) from the address generating circuit 23 based on the first enable signal Sb1 from the first shift timing generator 18A, and stores the same during the predetermined period Td. This predetermined period Td is the period in which the first shift timing generator 18 outputs again the first enable signal Sb1 to the first latch circuit 24A. During the period Td in which the address signal Sad is stored, the address signal Sad (address 1) stored in the first latch circuit 24A is applied through the output line to the first memory 11A.

The first enable signal Sb1 from the first shift timing generator 18 is supplied to the read timing generator 20, whereby a first read enable signal Sr1 is outputted from the read timing generator 20 and inputted to the first memory 11A. This read enable signal Sr1 has a signal waveform in which it falls after a predetermined time since it was outputted and in which it rises after a predetermined pulse width period. During the period in which the read enable signal Sr1 rises, the first memory 11A is activated. The pulse width from the trailing edge of the first read enable signal Sr1 to the leading edge is included in the period Td during which the address signal Sad is stored in the first latch circuit 24A.

At the time the period τ corresponding to the data transfer rate is passed after the enable signal Sb1 was outputted to the first latch circuit 24A, the first shift timing generating circuit 18 outputs the enable signal Sb2 to the second latch circuit 24B. The second latch circuit 24B receives the address signal Sad (address 2) stored in the first latch circuit 24A based on the input of the enable signal Sb2 and stores the same during the predetermined period Td. The second enable signal Sb2 is supplied to the read timing generator 20, whereby a second read enable signal Sr2 is outputted from the read timing generator 20 and inputted to the second memory 11B. Also, in this case, during the pulse width period of the read enable signal Sr2 included in the period Td during which the address signal Sad is stored in the second latch circuit 24B, the second memory 11B is activated.

At the time the period τ corresponding to the data transfer rate is passed after the second enable signal Sb2 was outputted to the second latch circuit 24B, the first shift timing generating circuit 18 outputs the third enable signal Sb3 to the third latch circuit 24C. The third latch circuit 24C receives the address signal Sad (address 1) stored in the second latch circuit 24B based on the input of the third enable signal Sb3 and stores the same during the predetermined period Td. The third enable signal Sb3 is supplied to the read timing generator 20, whereby a third read enable signal Sr3 is outputted from the read timing generator 20 and inputted to the third memory 11C. Also, in this case, during the pulse width period of the read enable signal Sr3 included in the period Td during which the address signal Sad is stored in the third latch circuit 24C, the third memory 11C is activated.

At the time the period τ corresponding to the data transfer rate is passed after the third enable signal Sb3 was outputted to the third latch circuit 24C, the first shift timing generating circuit 18 outputs the fourth enable signal Sb4 to the fourth latch circuit 24D. The fourth latch circuit 24D receives the address signal Sad (address 1) stored in the third latch circuit 24C based on the input of the fourth enable signal Sb4 and stores the same during the predetermined period Td. The fourth enable signal Sb4 is supplied to the read timing generator 20, whereby a fourth read enable signal Sr4 is outputted from the read timing generator 20 and inputted to the fourth memory 11D. Also, in this case, during the pulse width period of the read enable signal Sr4 included in the period Td during which the address signal Sad is stored in the fourth latch circuit 24D, the fourth memory 11D is activated.

On the other hand, after the read request signal Sr inputted to the read gate circuit 16B was delayed by the delay circuit 21 by the predetermined period Td, the second shift timing generator 22 receives the reference clock CLK from the clock generator 7 and outputs the sequence signal Sc to the multiplexer 14 at every predetermined period (period τ corresponding to the data transfer rate) from the time the reference clock CLK is inputted. Then, the multiplexer 14 connects sequentially and electrically the first to fourth input terminals φ1 to φ4 and the output terminal at very predetermined period τ based on the sequence signal Sc from the second shift timing generator 22.

During the pulse width period of the first enable signal Sr1, the data DATA1 is read out from the storage area of the first memory 11A at its storage address shown by the address signal Sad (address 1) stored in the first latch circuit 24A, and supplied through the internal bus to the first input terminal φ1 of the multiplexer 14.

During the pulse width period after the predetermined period of the second read enable signal Sr2 (after the period τ corresponding to the data transfer rate is passed from the start point of the pulse width of the first read enable signal Sr1), the data DATA 2 is read out from the storage area in the second memory 11B at its storage address shown by the address signal Sad (address 1) stored in the second latch circuit 24B and supplied through the internal bus to the second input terminal φ2 of the multiplexer 14.

During the pulse width period after the predetermined period of the third read enable signal Sr3 (after the period τ corresponding to the data transfer rate is passed from the start point of the pulse width of the second read enable signal Sr2), the data DATA 3 is read out from the storage area in the third memory 11C at its storage address shown by the address signal Sad (address 1) stored in the third latch circuit 24C and supplied through the internal bus to the third input terminal φ3 of the multiplexer 14.

During the pulse width period after the predetermined period of the fourth read enable signal Sr4 (after the period τ corresponding to the data transfer rate is passed from the start point of the pulse width of the third read enable signal Sr3), the data DATA 4 is read out from the storage area in the fourth memory 11D at its storage address shown by the address signal Sad (address 1) stored in the fourth latch circuit 24D and supplied through the internal bus to the fourth input terminal φ4 of the multiplexer 14.

The time point the second shift timing generator 22 starts to output the sequence signal Sc is the time point delayed by the predetermined period Td from the time point the read request signal Sr was inputtted by the signal processor 3 and the time point delayed by several 10s of nanoseconds from the time point the first read enable signal Sr1 was started being outputted. At the time the first sequential signal Sc is supplied to the multiplexer 14, during the pulse width period of the first read enable signal Sr1, the data DATA1 read out from the first memory 11A is supplied to the first input terminal φ1 of the multiplexer 14 so that the data DATA1 from the first memory 11A is outputted from the output terminal of the multiplexer 14 as first data in the data row. This output period is the period until the next sequence signal is supplied, i.e., the period τ corresponding to the data transfer rate.

At the time the second sequence signal is supplied to the multiplexer 14, during the pulse width period of the second read enable signal Sr2, the data DATA2 read out from the second memory 11B is supplied to the second input terminal φ2 so that the data DATA2 from the second memory 11B is outputted from the output terminal of the multiplexer 14 as second data in the data row. Similarly, the third and fourth sequence signals Sc are supplied to the multiplexer 14, whereby the data DATA3 and data DATA4 from the third and fourth memories 11C and 11D are outputted from the output terminal of the multiplexer 14 as third and fourth data in the data row.

Before the period Td in which the address signal Sad is stored in the first latch circuit 24A is passed, the address timing generator 17 outputs the updating signal Sa to the address generating circuit 23, whereby the address generating circuit 23 generates the address signal Sad (address 2) whose storage address is incremented by φ1 based on the input of the updating signal Sa and outputs the same to the first latch circuit 24A.

The first latch circuit 24A receives the updated address signal Sad (address 2) from the address generating circuit 23 based on the input of the first enable signal Sb1 again outputted from the first shift timing generator 18, and stores the same during the predetermined period Td. Then, the timing generator 20 outputs the first read enable signal Sr1 having a predetermined signal waveform (signal waveform which falls after a predetermined period and which rises after a predetermined pulse width period) relative to the first memory 11A, thereby activating the first memory 11A.

Therefore, during the pulse width period of the first read enable signal Sr1, the data DATA5 is read out from the storage area of the first memory 11A at its storage area shown by the address signal Sad (address 2) stored in the first latch circuit 24A, and supplied through the internal bus to the first input terminal φ1 of the multiplexer 14.

Then, at the time the fifth sequence signal Sc from the second shift timing generator is supplied to the multiplexer 14, during the pulse width period of the first read enable signal Sr1, the data DATA read out from the first memory 11A is supplied to the first input terminal φ1 of the multiplexer 14 so that the data DATA from the first memory 11A is outputted from the output terminal of the multiplexer 14 as fifth data in the data row.

Similarly, sixth to eighth sequence signals Sc are supplied to the multiplexer 14, whereby the data DATA6 to DATA8 from the second to fourth memories 11B to 11D are outputted from the output terminal of the multiplexer 14 as the sixth to eighth data in the data row.

In general, data read out from the first memory 11A is transmitted from the multiplexer 14 to the data bus as 4n+1th (n =0, 1, 2, . . . ) data in the data row, data read out from the second memory 11B is transmitted from the multiplexer 14 to the data bus as 4n+2th data in the data row, data read out from the third memory 11C is transmitted from the multiplexer 14 to the data bus as 4n+3th data in the data row, and data read out from the fourth memory 11D is transmitted from the multiplexer 14 to the data bus as 4n+4th data in the data row.

As described above, in the data read processing, even when the period in which the address signals Sad are supplied to the first to fourth memories 11A to 11D (corresponding to the periods Td in which the address signals Sad are stored in the first to fourth latch circuits 24A to 24D) are set to be long periods in accordance with the access speeds to the memories 11A to 11D, the timings at which data are read out from the first to fourth memories 11A to 11D can be reduced compared with the period Td during which the above address signal Sad is supplied. As a result, consecutive data row of large amount can be transmitted at high speed without extending the time base. Therefore, the data storing means and data transmitting means for storing the data read out from the first to fourth memories 11A to 11D until the end of the data row and transmitting them at high speed need not be provided, and hence the circuit arrangement can be simplified.

Specifically, in the first embodiment, since timings at which data are read out from the first to fourth memories 11A to 11D are shifted by each period τ corresponding to the data transfer rate and consecutive data read out from the first to fourth memories 11A to 11D are transmitted through the multiplexer 14 to the data bus, the timings at which data are read out from the first to fourth memories 11A to 11D can be made coincident with the data transfer rate. In addition, the data storing circuit for storing all data read out from the first to fourth memories 11A to 11D need not be provided.

Figure 8:
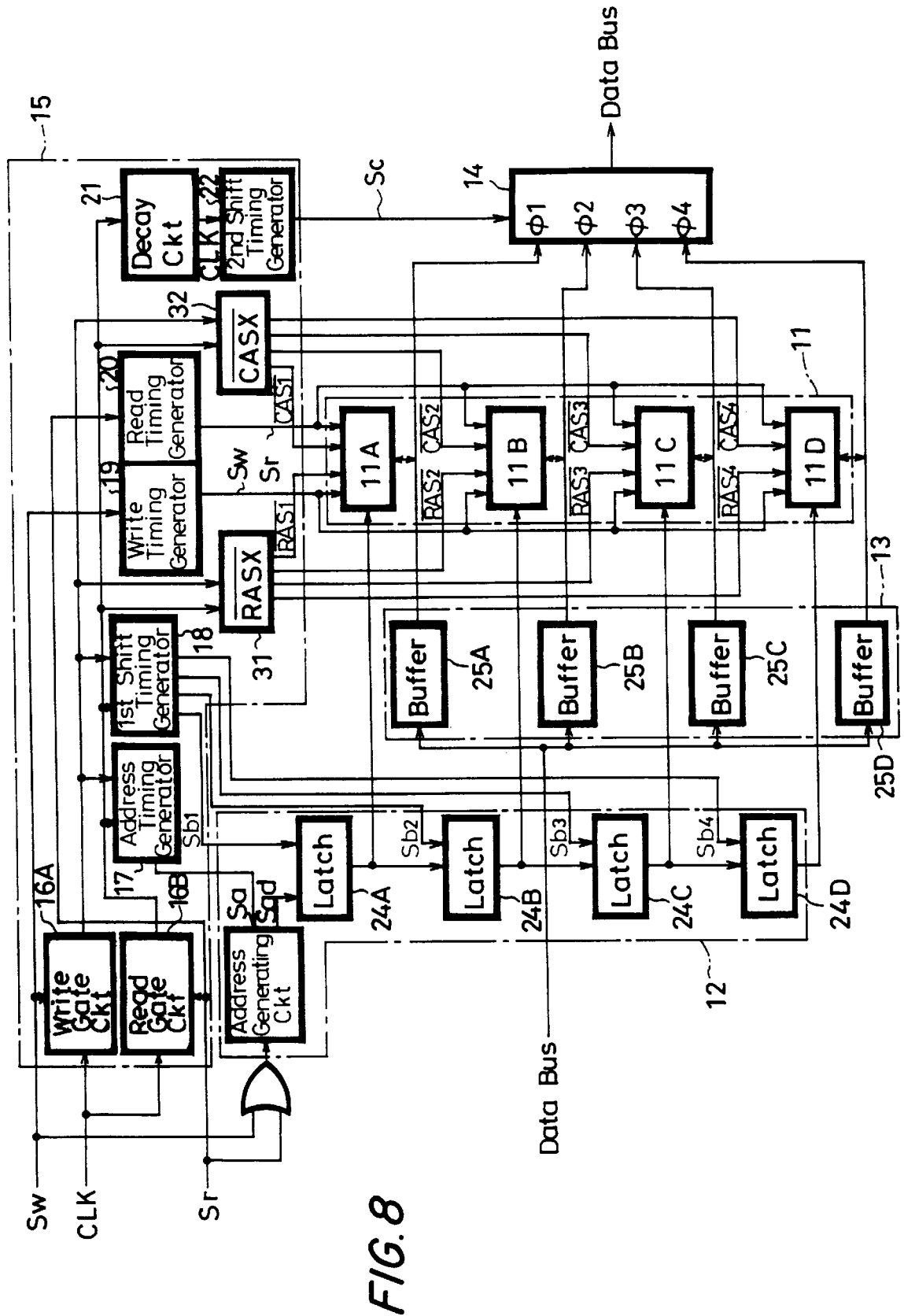
FIG. 8 is a block diagram showing a disk cache comprising a data storage device and a data reading apparatus according to another embodiment of the present invention.

The disk cache 8 according to the second embodiment will be described with reference to FIGS. 8 to 10. In FIGS.

8 to 10, like parts corresponding to those of FIG. 5 are marked with the same references.

The disk cache 8 according to the second embodiment has substantially the same arrangement as that of the disk cache 8 according to the first embodiment but differs from the cache 8 according to the first embodiment in the following points.

Specifically, as shown in FIG. 9, the write timing generator 19 is connected in such a manner that the write enable signal Sw1 of low level is commonly supplied to the memories 11A to 11D based on the input of the write request signal Sw from the signal processor 3; the read timing generator 20 is connected in such a manner that the read enable signal Sr1 of low level is commonly supplied to the memories 11A to 11D based on the input of the read request signal Sr from the signal processor 3; there are provided a row-side clock generator 31 and a column-side clock generator 32 for outputting a row-side access signal/RASX and a column-side access signal/CASX based on the reference clock CLK from the write gate circuit 16A or the read gate circuit 16B; and contents of the address signal Sad outputted from the address generating circuit 23 are consecutive row address and column address.

The four memories 11A to 11D used in the disk cache 8 according to the second embodiment are each formed of DRAM having an ordinary access timing.

A signal processing operation of the disk cache 8 according to the second embodiment, in particular, a signal processing operation in which the data row transmitted from the signal processor 3 through the data bus is transmitted from the disk cache 8 through the data bus to the hard disk device 4 will be described with reference to also timing charts shown in FIGS. 9 and 10.

In the timing charts shown in FIGS. 9 and 10, although it seem that timings are sequentially determined from the memory access signal such as /RAS or /CAS, in actual practice, the timings are such one that data inputtted to the memories 11A to 11D and data outputted from the memories 11A to 11D are uniquely determined depending on the circumstances of peripheral circuits. Accordingly, the timings of the memory access signals are timings matched with the above timings.

The data inputted to the memories 11A to 11D and the data outputted from the memories 11A to 11D are both set to the same transfer rate as that of the reference clock CLK and therefore cannot be written in and read out from the memories 11A to 11D (DRAM). The memory access signals and address signal Sad are formed from the frequency of 20.8 MHz=48 nanoseconds of the reference clock CLK.

In the second embodiment, in order to continuously write data, the write enable signal Sw1 is held at low level (LOW) over the entire write interval and the write timing is determined by the trailing edge of the /RASX. In other words, data may be stored before and after the trailing edge of the /CASX. Further, an access time Tac of one memory is set to 192 nanoseconds in association with the reference clock CLK.

Then, the row address is determined at the trailing edge of the /RASX and the column address is determined at the trailing edge of the /CASX. At the trailing edge of the /CASX, the write data may be inputted. At that time, data may be determined at the same timing of the trailing edge of the /CASX and after the trailing edge of the /CASX, data may be stored more than 15 nanoseconds. In the examples of FIGS. 9 and 10, since the data transfer rate is in the interval of 48 nanoseconds, the write timing can be satisfied by setting the /CASX at substantially the center of such interval.

The manner in which data is written in the disk cache 8 according to the second embodiment will be described with reference to FIG. 9. Based on the write request signal Sw inputted to the address generating circuit 23 from the signal processor 3 (see FIG. 4) through the control bus, the address generating circuit 23 generates an address signal in which row address and column address are in series and outputs the same to the first latch circuit 24A. The first latch circuit 24A receives the address signal Sad from the address generating circuit 23 based on the input of the first enable signal Sb1 from the first shift timing generator 18 (in the example shown in FIG. 9, generated after three-reference clock period from the inputted timing point of the write request signal), and stores the same during the predetermined period Td. Specifically, as shown in FIG. 9, the first row address is stored during a two-reference clock period and the column address is stored during the two-reference clock period.

The above-mentioned predetermined period is the period during which the first enable signal Sb1 is outputted again to the first latch circuit 24A from the first shift timing generator 18. During the period Td in which the address signal Sad is stored, the address signal Sad stored in the first latch circuit 24A is applied to the first memory 11A through the output line.

The write request signal Sw from the signal processing circuit 3 is inputted to the write timing generator 19, and the write timing generator 19 outputs the write enable signal Sw1 of low level to the memories 11A to 11D based on the input of the write request signal.

On the other hand, the row-side clock generator 31 counts the reference clock CLK obtained when the reference clock CLK is inputted from the write gate circuit 16A, outputs a first row-side external clock signal /RAS1 (hereinafter simply referred to as signal /RAS1) having a pulse waveform in which two reference clocks of low level and two reference clocks of high level are continued to the first memory 11A, and outputs a second row-side external clock signal /RAS2 (hereinafter simply referred to as "/RAS2") which is phase-delayed from the signal /RAS1 by one reference clock amount to the second memory 11B. Further, the row-side clock generator 31 outputs a third row-side external clock signal /RAS3 (hereinafter referred to as "signal /RAS3) which is phase-delayed from the signal /RAS2 by one reference clock amount to the third memory 11C, and outputs a fourth row-side external clock signal /RAS4 (hereinafter simply referred to as "/RAS4") which is phase-delayed from the signal /RAS3 by one reference clock amount to the fourth memory 11D.

The column-side clock generator 32 outputs the first column-side external clock signal /CAS1 (hereinafter simply referred to as "/CAS1") having a pulse waveform whose phase is delayed from the signal /RAS1 by one reference clock to the first memory 11A by counting the reference clock CLK generated when the reference clock CLK from the write gate circuit 16A is inputted, outputs a second column-side external clock signal /CAS2 (hereinafter simply referred to as "/CAS2") whose phase is delayed from the signal /CAS1 by one reference clock to the second memory 11B, outputs a third column-side external clock signal /CAS3 (hereinafter simply referred to as "/CAS3") whose phase is delayed from the signal /CAS2 by one reference clock to the third memory 11C, and outputs a fourth column-side external clock signal /CAS4 (hereinafter simply referred to as "/CAS4") whose phase is delayed from the signal /CAS3 by one reference clock to the fourth memory 11D.

The signal processor 3 transmits data row after a predetermined period is passed since the data write request signal Sw was outputted when, in particular, data row is written. This timing is determined based on the counting of the reference clock CLK generated from the clock generator 7. As shown in FIG. 9, for example, after a predetermined period is passed (5 reference clock periods are passed in FIG. 9), since the data write request signal Sw was outputted, data row is outputted from the signal processor 3 through the data bus.

After one reference clock is passed since the first enable signal Sb1 was outputted to the first latch circuit 24A, the second enable signal Sb2 is outputted from the first shift timing generator 18 to the first latch circuit 24B. The second latch circuit 24B receives the address signal Sad stored in the first latch circuit 24A based on the input of the second enable signal Sb2 and stores the same during the predetermined period Td.

After one reference clock is passed since the second enable signal Sb2 was outputted to the second latch circuit 24B, the third enable signal Sb3 is outputted from the first shift timing generator 18 to the third latch circuit 24C. The third latch circuit 24C receives the address signal Sad stored in the second latch circuit 24B based on the input of the third enable signal Sb3 and stores the same during the predetermined period Td.

After one reference clock is passed since the third enable signal Sb3 was outputted to the third latch circuit 24C, the fourth enable signal Sb4 is outputted from the first shift timing generator 18 to the fourth latch circuit 24D. The fourth latch circuit 24D receives the address signal Sad stored in the third latch circuit 24C based on the input of the fourth enable signal Sb4 and stores the same during the predetermined period Td.

Since the signal /RAS1 from the row-side clock generator 31 falls after 1.5 reference clock periods are passed since the first enable signal Sb1 to the first latch circuit 24A was outputted, at this trailing edge of the signal /RAS1, the row address 1 stored in the first latch circuit 24A is stored in the first memory 11A. Further, since the signal /CAS1 from the column-side clock generator 32 falls after one reference clock period is passed since the signal /RAS1 falls, at this trailing edge of the signal /CAS1, the column address 1 stored in the first latch circuit 24A is stored in the first memory 11A.

At the time the column address 1 is inputted to the first latch circuit 24A, the first data DATA1 in the data row is inputted to the first to fourth buffers 25A to 25D so that the time in which the column address is inputted is an intermediate point at which the first data DATA1 is stored in the first to fourth buffers 25A to 25D. Accordingly, at the time the column address 1 stored in the latch circuit 24A is stored in the first memory 11A, the first memory 11A is activated so that the first data DATA1 stored in the first buffer 25A is stored in the first memory 11A through the internal bus. The first data DATA1 latched through the internal bus is stored in the first memory 11A at its memory area, i.e., storage area shown by the address signal Sad (row address 1 and column address 1) from the first latch circuit 24A.

Similarly, after 1.5 reference clock periods are passed (at the trailing edge of the signal /RAS2) since the second enable signal Sb2 was outputted to the second latch circuit 24B (after one reference clock period is passed since the first enable signal Sb1 was outputted), the row address 1 stored in the second latch circuit 24B is stored in the second memory 11B. Further, after one reference clock is passed (at the trailing edge of the signal /CAS2) from the trailing edge of the signal /RAS2, the column address 1 stored in the second latch circuit 24B is stored in the second memory 11B. At this timing point, the second memory 11B is activated so that the second data DATA2 stored in the second buffer 25B is stored in the second memory 11B and written in the second memory 11B at its memory area, i.e., storage area shown by the address signal Sad (row address 1 and column address 1) from the second latch circuit 24B.

After 1.5 reference clock periods are passed (at the trailing edge of the signal /RAS3) since the third enable signal Sb3 was outputted to the third latch circuit 24C (after one reference clock period is passed since the second enable signal Sb2 was outputted), the row address 1 stored in the third latch circuit 24C is stored in the third memory 11C. Further, after one reference clock is passed (at the trailing edge of the signal /CAS3) from the trailing edge of the signal /RAS3, the column address 1 stored in the third latch circuit 24C is stored in the third memory 11C. At this timing point, the third memory 11C is activated so that the third data DATA3 stored in the third buffer 25C is stored in the third memory 11C and written in the third memory 11C at its memory area, i.e., storage area shown by the address signal Sad (row address 1 and column address 1) from the third latch circuit 24C.

After 1.5 reference clock periods are passed (at the trailing edge of the signal /RAS4) since the fourth enable signal Sb4 was outputted to the fourth latch circuit 24D (after one reference clock period is passed since the third enable signal Sb3 was outputted), the row address 1 stored in the fourth latch circuit 24D is stored in the fourth memory 11D. Further, after one reference clock is passed (at the trailing edge of the signal /CAS4) from the trailing edge of the signal /RAS4, the column address 1 stored in the fourth latch circuit 24D is stored in the fourth memory 11D. At this timing point, the fourth memory 11D is activated so that the fourth data DATA4 stored in the fourth buffer 25D is stored in the fourth memory 11C and written in the fourth memory 11C at its memory area, i.e., storage area shown by the address signal Sad (row address 1 and column address 1) from the fourth latch circuit 24D.

After the period Td in which the address signal Sad is stored in the first latch circuit 24A is passed, the address timing generator 17 outputs the updating signal Sa to the address generating circuit 23. Therefore, the address generating circuit 23 generates an address signal Sad (row address 2 and column address 2 in the illustrated example) wherein only row address or column address or both of row address and column address are incremented by +1) based on the updating signal Sa and outputs the same to the first latch circuit 24A.

The first latch circuit 24A receives the updated row address 2 and column address 2 from the address generating circuit 23 based on the input of the first enable signal Sb1 again outputted from the first shift timing generator 18 and stores them during the predetermined period Td. After 1.5 reference clock periods are passed (at the trailing edge of the signal /RAS1 from the row-side clock generator 31) since the first enable signal Sb1 was inputted, the row address 2 from the first latch circuit 24A is stored in the first memory 11A. Further, after one reference clock period is passed (at the trailing edge of the signal /CAS1 from the column-side clock generator 32), the column address 2 from the first latch circuit 24A is stored in the first memory 11A, whereby the fifth data DATA5 stored in the first buffer 25A is stored in the first memory 11A.

Similarly, the sixth data DATA6 in the data row is written in the second memory 11B, the seventh data DATA7 is written in the third memory 11C, and the eighth data DATA8 is written in the fourth memory 11D.

In general, 4n+1th (n=0, 1, 2, . . . ) data is stored in the storage area of the first memory 11A at its address shown by the address signal Sad stored in the first latch circuit 24A, 4n+2th data is stored in the storage area of the second memory 11B at its address shown by the address signal Sad stored in the second latch circuit 24B, 4n+3th data is stored in the storage area of the third memory 11C at its address shown by the address signal Sad stored in the third latch circuit 24C, and 4n+4th data is stored in the storage area of the fourth memory 11D at its address shown by the address signal Sad stored in the fifth latch circuit 24D.

As described above, in the data write processing, even when the period in which the address signals Sad are applied to the first to fourth memories 11A to 11D (corresponding to the periods Td in which the address signals Sad are stored in the first to fourth latch circuits 24A to 24D) are set to be long periods in accordance with the access speeds to the memories 11A to 11D, the timings at which data are written in the first to fourth memories 11A to 11D can be made the same as the timings at which data are supplied to the first to fourth buffers 25A to 25D (data transfer rate). As a result, consecutive data row of large amount supplied at high speed through the data bus can be supplied to the first to fourth memories 11A to 11D in parallel without extending the time base. Therefore, the data storing circuits such as buffers for storing a large number of data transmitted at high speed until the end of the data row for a long period of time need not be provided, and hence the circuit arrangement can be simplified.

Specifically, in the second embodiment, since timings at which data are written in the first to fourth memories 11A to 11D are shifted by each period r corresponding to the data transfer rate and consecutive data inputted to the first to fourth buffers 25A to 25D are written in the first to fourth memories 11A to 11D, the timings at which the data are written in the first to fourth memories 11A to 11D can be made coincident with the data transfer rate. In addition, the data storing circuit for storing data to be written in the first to fourth memories 11A to 11D need not be provided.

The data read processing will be described with reference to FIG. 10. In the disk cache 8 according to the first embodiment, the ordinary memories are assumed, and hence data are read out at the trailing edges of the read enable signals Sr1 to Sr4. However, in the disk cache 8 according to the second embodiment, the whole of the read interval of the read enable signal is held at low (LOW) level, and the read timing of data is determined by the trailing edge of the signal /CASX.

At that time, the data is determined at the time point delayed from the trailing edge of the signal /CASX by about 20 nanoseconds. Thereafter, the determined data is continued to be outputted during the period in which the signal /CASX is held at low level. According to the second embodiment, this period is set to about 76 nanoseconds.

The manner in which data are read out from the disk cache 8 according to the second embodiment will be described below. Based on the input of the read request signal Sr transmitted to the address generating circuit 23 from the signal processor 3 (see FIG. 4) through the control bus 3, the address generating circuit 23 generates the address signal Sad in which the row address and the column address are made series and outputs this address signal Sad to the first latch circuit 24A. Based on the input of the first enable signal Sb1 (generated after three reference clock periods are passed since the read request signal Sr is inputted in the example of FIG. 10) from the first shift timing generator 18, the first latch circuit 24A receives the address signal Sad from the address generating circuit 23 and stores the same during the predetermined period Td. Specifically, as shown in FIG. 10, the first latch circuit 24A holds the first input row address during two reference clock periods and holds the column address during two reference clock periods.

The above predetermined period Td is the period in which the first enable signal sb1 is outputted to the first latch circuit 24A from the first shift timing generator 18. During the period Td in which this address signal Sad is stored, the address signal Sad stored in the first latch circuit 24A is applied through the output lines to the first memory 11A.

The read request signal Sr from the signal processor 3 is inputted to the read timing generator 20 and the read timing generator 20 outputs the read enable signal Sr1 of low level to the memories 11A to 11D based on the input of the read request signal Sr.

On the other hand, by counting the reference clock CLK obtained when the reference clock CLK from the read gate circuit 16B is inputted (input at the trailing edge), the row-side clock generator 31 outputs the signal /RAS1 having a continuous pulse waveform in which two reference clocks are held at low level and two reference clocks are held at high level to the first memory 11A, the signal /RAS2 whose phase is delayed from the signal /RAS2 by one reference clock to the second memory 11B, the signal /RAS3 whose phase is delayed from the signal /RAS2 by one reference clock to the third memory 11C, and outputs the signal /RAS4 whose phase is delayed from the signal /RAS3 by one reference clock to the fourth memory 11D.

By counting the reference clock CLK obtained when the reference clock CLK from the read gate circuit 16B is inputted (input at the trailing edge), the column-side clock generator 32 outputs the signal /CAS1 having a pulse waveform whose phase is delayed from one reference clock from the signal /RAS1 to the first memory 11A, the signal /CAS2 whose phase is delayed from the signal /CAS1 by one reference clock to the second memory 11B, the signal /CAS3 whose phase is delayed from the signal /CAS2 by one reference clock to the third memory 11C, and outputs the signal /CAS4 whose phase is delayed from the signal /CAS3 by one reference clock to the fourth memory 11D.

After one reference clock is passed since the first enable signal Sb1 was outputted to the first latch circuit 24A, the first shift timing generator 18 outputs the second enable signal Sb2 to the second latch circuit 24B. Based on the input of the second enable signal Sb2, the second latch circuit 24B receives the address signal Sad stored in the first latch circuit 24A and stores the same during the predetermined period Td.

After one reference clock is passed since the second enable signal Sb2 was outputted to the second latch circuit 24B, the first shift timing generator 18 outputs the third enable signal Sb3 to the third latch circuit 24C. Based on the input of the third enable signal Sb3, the third latch circuit 24C receives the address signal Sad stored in the second latch circuit 24B and stores the same during the predetermined period Td.

After one reference clock is passed since the third enable signal Sb3 was outputted to the third latch circuit 24C, the first shift timing generator 18 outputs the fourth enable signal Sb4 to the fourth latch circuit 24D. Based on the input of the fourth enable signal Sb4, the fourth latch circuit 24D receives the address signal Sad stored in the third latch circuit 24C and stores the same during the predetermined period Td.

After 1.5 reference clock periods are passed since the first enable signal Sb1 was outputted to the first latch circuit 24A, the signal /RAS1 from the row-side clock generator 31 falls at the trailing edge of the signal /RAS1. Therefore, at this trailing edge, the row address 1 stored in the first latch circuit 24A is stored in the first memory 11A. After one reference clock is passed since the signal /RAS1 fell, the signal /CAS1 from the column-side clock generator 32 falls so that the column address 1 stored in the first latch circuit 24A is stored in the first memory 11A.

At the time the column address 1 is inputted to the first latch circuit 24A, the first memory 11A is activated so that the data DATA1 stored in the storage address shown by the address signal Sad (row address 1 and column address 1) from the first latch circuit 24A from the data stored in the first memory 11A is read out as the first data in the data row. After about 20 nanoseconds are passed from this reading time point, the read data DATA1 is determined, and applied to the first input terminal $\phi1$ of the multiplexer 14 at the succeeding stage. This determined data DATA1 is continued to be applied to the first input terminal $\phi1$ during the period until the leading edge of the signal /CAS1, i.e., about 76 nanoseconds.

Similarly, after 1.5 reference clock periods are passed (trailing edge of the signal /RAS2) since the second enable signal Sb2 was outputted to the second latch circuit 24B, the row address 1 stored in the second latch circuit 24B is stored in the second memory 11B. Further, after one reference clock period is passed (at the trailing edge of the signal /CAS2) from the trailing edge of the signal /RAS2, the column address 1 stored in the second latch circuit 24B is stored in the second memory 11B.

At this timing point, the second memory 11B is activated so that the data DATA2 stored in the storage address shown by the address signal Sb2 (row address 1 and column address 1) from the second latch circuit 24B is read out from the data stored in the second memory 11B as second data in the data row. After about 20 nanoseconds are passed from this reading time point, the read out data DATA2 is determined, and applied to the second input terminal $\phi2$ of the multiplexer 14 at the succeeding stage. The determined data DATA2 is continued to be outputted to the second input terminal $\phi2$ during substantially the period in which the signal /CAS2 rises.

After 1.5 reference clock periods are passed (trailing edge of the signal /RAS3) since the third enable signal sb3 was outputted to the third latch circuit 24C (after one reference clock period is passed since the second enable signal Sb2 was outputted), the row address 1 stored in the third latch circuit 24C is stored in the third memory 11C. Further, after one reference clock period is passed (at the trailing edge of the signal /CAS3) since the signal /RAS3 fell, the column address 1 stored in the third latch circuit 24C is stored in the third memory 11C.

At this timing point, the third memory 11C is activated so that the data DATA3 stored in the storage address shown by the address signal Sad (row address 1 and column address 1) from the third latch circuit 24C is read out from the data stored in the third memory 11C as the third data in the data row. After about 20 nanoseconds are passed from this reading time point, the read data DATA3 is determined, and applied to the third input terminal $\phi3$ of the multiplexer 14 at the succeeding stage. This determined data DATA 3 is continued to be applied to the third input terminal $\phi3$ during substantially a period till the leading edge of the signal /CAS3.

After 1.5 reference clock periods are passed (one reference clock period is passed since the third enable signal Sb3 was outputted) since the fourth enable signal Sb4 was outputted to the fourth latch circuit 24D, the row address 1 stored in the fourth latch circuit 24D is stored in the fourth memory 11D. Further, after one reference clock is passed from the trailing edge of the signal /RAS4 (trailing edge of the signal /CAS4), the column address 1 stored in the fourth latch circuit 24D is stored in the fourth memory 11D.

At this time point, the fourth memory 11D is activated so that the data DATA4 stored in the storage address shown by the address signal Sad (row address and column address) from the fourth latch circuit 24D is read out from the data stored in the fourth memory 11D as the fourth data in the data row. After about 20 nanoseconds are passed from this reading time point, the read data DATA is determined, and applied to the fourth input terminal $\phi4$ of the multiplexer 14 at the succeeding stage. The determined data DATA4 is continued to be applied to the fourth input terminal $\phi4$ during substantially a period until the leading edge of the signal /CAS4.

Timing point at which the second shift timing generator 22 starts to output the sequence signal Sc is a timing point delayed by six reference clock periods since the read request signal Sr was inputted. At the time the first sequence signal is supplied to the multiplexer 14, the determined data DATA1 read out from the first memory 11A is applied to the first input terminal $\phi1$ so that the determined data DATA1 from the first memory 11A is outputted from the output terminal of the multiplexer 14 as the first data in the data row. This output period is the period until the next sequence signal Sc is supplied, i.e., the period r (reference clock period) corresponding to the data transfer period.

At the time the second sequence signal Sc is supplied to the multiplexer 14, the determined data DATA2 read out from the second memory 11B is applied to the second input terminal $\phi2$ so that the determined data DATA2 from the second memory 11B is outputted from the output terminal of the multiplexer 14 as the second data in the data row. Similarly, the third and fourth sequence signals Sc are sequentially supplied to the multiplexer 14 so that the determined data DATA3 from the third memory 11C and the determined data DATA4 from the fourth memory 11D are outputted from the output terminal of the multiplexer 14 as the third data and the fourth data in the data row.

Before the period Td in which the address signal Sad is stored in the first latch circuit 24A is passed, the address timing generator 17 generates the updating signal Sa to the address generating circuit 23. Then, the address generating circuit 23 generates an address signal (row address 2 and column address 2) in which only row address or column address or both of row address and column address are incremented by +1 based on the input of the updating signal Sa, and outputs the same to the first latch circuit 24A.

Based on the input of the first enable signal Sb1 again outputted from the first shift timing generator 18, the first latch circuit 24A receives updated row address 2 and column address 2 from the address generating circuit 23 and stores them during the predetermined period Td. After 1.5 reference clock periods are passed (at the trailing edge of the signal /RAS1 from the row-side clock generator 31) since the first enable signal Sb1 was inputted, the row address 2 from the first latch circuit 24A is stored in the first memory 11. Further, after one reference clock period is passed (at the trailing edge of the signal /CAS1 from the column-side clock generator 32), the first memory 11A is activated so that the data DATA5 stored in the storage address shown by the address signal Sad (row address 2 and column address 2) from the first latch circuit 24A is read out from the data stored in the first memory 11A as the fifth data in the data row. After about 20 nanoseconds are passed from this reading time point, the read data DATA5 is determined, and applied to the first input terminal φ1 of the multiplexer 14 at the succeeding stage. The determined data DATA5 is continued to be applied to the first input terminal φ1 during subtantially a period until the signal /CAS1 rises.

Then, at the time the fifth sequence signal Sc is supplied to the multiplexer 14, the determined data DATA5 read out from the first memory 11A is supplied to the first input terminal φ1 so that the data DATA5 from the first memory 11A is outputted from the output terminal of the multiplexer 14 as the fifth data in the data row.

Similarly, when the sixth to eighth sequence signals Sc are supplied to the multiplexer 14 sequentially, the data DATA6 to DATA8 from the second to fourth memories 11B to 11D are sequentially outputted from the output terminal of the multiplexer 14 as the sixth to eighth data in the data row.

In general, data read out from the first memory 11A is transmitted to the data bus as the 4n+1th (n=0, 1, 2, . . . ) data in the data row from the multiplexer 14, data read out from the second memory 11B is transmitted to the data bus as the 4n+2th data in the data row from the multiplexer 14, data read out from the third memory is transmitted to the data bus as the 4n+3th data in the data row from the multiplexer 14, and data read out from the fourth memory 14D is transmitted to the data bus as the 4n+4th data in the data row from the multiplexer 14.

As described above, in the data read processing, even when the period Td in which the address signals Sad are supplied to the first to fourth memories 11A to 11D (corresponding to the periods Td in which the address signals Sad are stored in the first to fourth latch circuits 24A to 24D) are set to be long periods in accordance with the access speeds to the memories 11A to 11D, the timings at which data are read out from the first to fourth memories 11A to 11D can be reduced compared with the period Td during which the above address signal Sad is supplied. As a result, consecutive data row of large amount can be transmitted at high speed without extending the time base. Therefore, the data storing means and data transmitting means for storing the data read out from the first to fourth memories 11A to 11D until the end of the data row and transmitting them at high speed need not be provided, and hence the circuit arrangement can be simplified.

Specifically, in the second embodiment, since timings at which data are read out from the first to fourth memories 11A to 11D are shifted by each period τ corresponding to the data transfer rate and consecutive data read out from the first to fourth memories 11A to 11D are transmitted through the multiplexer 14 to the data bus, the timings at which data are read out from the first to fourth memories 11A to 11D can be made coincident with the data transfer rate. In addition, the data storing circuit for storing all data read out from the first to fourth memories 11A to 11D need not be provided.

As described above, according to the disk cache 8 of the first and second embodiments, when data is read out from and written in the memories 11A to 11D of the disk cache 8 by the signal processor 3, even if the memory with low access speed relative to the data transfer rate from the signal processor 3 is used, the apparent memory access speed can be improved and, hence data can be read out and written in at high speed.

While the present invention is applied to the disk cache 8 inserted between the signal processor 3 and the hard disk device 4 by way of example, the present invention is not limited thereto and may be applied to a cache memory interconnected between the main storage device and the auxiliary storage device of the computer. Furthermore, the present invention may be applied to the main storage device itself.

As described above, there is provided a data writing circuit which comprises n data storing means sequentially receiving individual data stored in n data storage means at every predetermined period and for storing the supplied data during the predetermined period, n address storing means for receiving address information indicative of storage addresses of said data shifted at every predetermined period and for storing the supplied address information during a predetermined period in which address information is stored since the address information is supplied, and a write control circuit for activating the n data storing means at its data storing means in which the data stored in the data storing means is stored, wherein a data storing means of one data storing means is included in an address storing period of the address storing means corresponding to the data storing means, data stored in the corresponding data storing means is stored in the memory areas of the data memory means activated for writing data at its storage address shown by address information stored in the corresponding address storing means so that data row of large capacity can be continuously written in the n memories at high speed.

According to the present invention, there is provided a data reading circuit which comprises n address storing means sequentially receiving address information indicative of storage address of each data shifted at every predetermined period and storing the supplied address information during a predetermined period in which address information is stored since address information was supplied and a read control circuit for read-activating data storing means corresponding to the address storing means supplied with address information after a predetermined period is passed since the address information was supplied, wherein a read activation period for one data storage device is included in the address storing period of the address storing means corresponding to the data storing means, and data is read out from the storage area of the data storing means at its storage address shown by address information stored in the corresponding address. Therefore, data can be read out from the n memories and transmitted to the circuit system of the succeeding stage as high-speed and continuous mass-storage data row.

Furthermore, according to the present invention, there is provided a data transmission apparatus which comprises n data holding means provided in response to n data storing means, sequentially receiving individual data stored in the data storing means at every predetermined period and holding the supplied data during the predetermined period, n address holding means for sequentially receiving address information indicative of storage address of each data shifted at every predetermined period and holding the supplied address information during a predetermined address holding period from time point in which address information is supplied, a write control circuit for write-activating the n data storing means at its data storage means to which data held in the data holding means is to be supplied, and a read control circuit for read-activating a data storing means corresponding to the address holding means supplied with the address information after a predetermined period is passed since address information was supplied, wherein a data holding period in one data holding means is included in an address holding period of the address holding means corresponding to the data holding means, data held in the corresponding data holding means is stored in the storage area of the data storage means write-activated at its storage address shown by the address information held in the corresponding data holding means, a read activation period relative to one data storage device is included in an address holding period of the address holding means corresponding to the data storage means, and data is read out from the storage area of the read-activated data storage means at its storage address shown by the address information held in the corresponding address holding means. Therefore, continuous data row of large capacity between a computer and an external storage device, for example, can be accessed at high speed.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A data storage apparatus comprising:

a plurality of data holding means each respectively coupled to one of a plurality of data storing means for sequentially receiving individual data which is supplied thereto at a data transfer rate which is to be stored in said data storing means at every predetermined period and for holding supplied data during said predetermined period, in which the number of data storing means corresponds to a ratio between an access speed of said data storing means and said data transfer rate and in which the number of data holding means is equal to the number of data storing means;

a plurality of address holding means respectively coupled to said plurality of data storing means, receiving address information indicative of storage address of each data shifted at every predetermined period and holding supplied address information during a predetermined address holding period from a time point at which address information is supplied, a data holding period of said data holding means being included in the address holding period of an address holding means corresponding to said data holding means; and write control means for write-activating said plurality of data storing means at its data storing means in which data held in each data holding means is to be stored, wherein said write-activated data storing means stores data held in a corresponding data holding means at a storage position shown by address information held in a corresponding address holding means.

2. A data storage apparatus as claimed in claim 1, wherein a time point at which said data holding means starts to hold data is delayed by a predetermined time from a time point at which address information is supplied to a corresponding address holding means.

3. A data storage apparatus as claimed in claim 1, wherein each said data storing means of said write control means is write-activated by the level change of a write enable signal supplied to each said data storing means.

4. A data storage apparatus as claimed in claim 1, wherein each said data storing means of said write control means is write-activated by the level change of an address multiplex-system external clock signal supplied to each said data storing means.

5. A data reading apparatus comprising:

input means for receiving data at a data transfer rate and for supplying the received data to a plurality of data storing means, in which the number of data storing means corresponds to a ratio between an access speed of said data storing means and said data transfer rate;

a plurality of address holding means respectively coupled to the plurality of data storing means for receiving address information indicative of storage address of each data shifted at every predetermined period and for holding the address information during a predetermined address holding period from a time point at which address information is supplied; and read control means for read-activating a data storing means corresponding to an address holding means to which address information is supplied after a predetermined delay time has passed since address information was supplied, wherein a read-activation period relative to said data storing means is included in an address holding period at said address holding means corresponding to said data storing means, and said read-activated data storing means outputs data from a storage position shown by address information held in a corresponding address holding means.

6. A data reading apparatus according to claim 5, further comprising data selecting means connected to a succeeding stage of each said data storing means for sequentially selecting and outputting data read out from each said data storing means at a speed corresponding to a transfer rate.

7. A data reading apparatus as claimed in claim 5, wherein each said data storing means of said read control means is read-activated by the level change of a read enable signal supplied to each said data storing means.

8. A data reading apparatus as claimed in claim 5, wherein each said data storing means of said read control means is read-activated by the level change of an address multiplex-system external clock signal supplied to each said data storing means.

9. A data transmission apparatus comprising:

a plurality of data holding means each respectively coupled to one of a plurality of data storing means for sequentially receiving individual data which is supplied thereto at a data transfer rate which is to be stored in each said data storing means at every predetermined period and for holding supplied data during said predetermined period, in which the number of data storing means corresponds to a ratio between an access speed of said data storing means and said data transfer rate and in which the number of data holding means is equal to the number of data storing means;

a plurality of address holding means respectively coupled to said plurality of data storing means, receiving address information indicative of storage address of each data shifted at every said predetermined period and holding supplied address information during a predetermined address holding period from a time point at which address information is supplied;

write control means for write-activating said plurality of data storing means at its data storing means to which data stored in said data holding means is to be stored, said write-activated data storing means stores data held in a corresponding data holding means at a storage position shown by address information held in a corresponding address holding means; and read control means for read-activating a data storing means corresponding to an address holding means supplied with address information after a predetermined delay time since a time point at which address information was supplied, wherein a data holding period in said data holding means is in included in an address holding period in an address holding means corresponding to said data holding means, a read-activation period relative to said data storing means is included in an address holding period corresponding to said data storing means, and said read-activated data storing means outputs data from a storage position shown by address information held in a corresponding address holding means.

10. A data transmission apparatus according to claim 9, further comprising data selecting means connected to a succeeding stage of each said data storing means for sequentially selecting and outputting data read out from each said data storing means at a speed corresponding to a transfer rate.

11. A data transmission apparatus as claimed in claim 9, wherein a time point at which said data holding means starts to hold data is delayed by a predetermined time from a time point at which address information is supplied to a corresponding address holding means.

12. A data transmission apparatus as claimed in claim 9, wherein each said data storing means of said write control means is write-activated by the level change of a write enable signal supplied to each said data storing means.

13. A data transmission apparatus as claimed in claim 9, wherein each said data storing means of said write control means is write-activated by the level change of an address multiplex-system external clock signal supplied to each said data storing means.

14. A data transmission apparatus as claimed in claim 9, wherein each said data storing means of said read control means is read-activated by the level change of a read enable signal supplied to each said data storing means.

15. A data transmission apparatus as claimed in claim 9, wherein each said data storing means of said read control means is read-activated by the level change of an address multiplex-system external clock signal supplied to each said data storing means.

* * * * *